United States Patent
DeSpain

(10) Patent No.: US 12,136,042 B2
(45) Date of Patent: Nov. 5, 2024

(54) ASYMMETRICAL MULTILATERAL DECISION SUPPORT SYSTEM

(71) Applicant: BrainThrob Laboratories, Inc., Sandy, UT (US)

(72) Inventor: Erin C. DeSpain, Sandy, UT (US)

(73) Assignee: BrainThrob Laboratories, Inc., Sandy, UT (US)

( * ) Notice: Subject to any disclaimer, the term of this patent is extended or adjusted under 35 U.S.C. 154(b) by 1020 days.

(21) Appl. No.: 16/921,975

(22) Filed: Jul. 7, 2020

(65) Prior Publication Data
US 2020/0334280 A1 Oct. 22, 2020

Related U.S. Application Data

(63) Continuation of application No. 15/649,267, filed on Jul. 13, 2017, now Pat. No. 10,747,796, which is a continuation of application No. 14/402,881, filed as application No. PCT/US2013/042787 on May 27, 2013, now Pat. No. 9,727,640, which is a continuation-in-part of application No. 13/480,529, filed on May 25, 2012, now Pat. No. 8,560,478.

(51) Int. Cl.
| | |
|---|---|
| G06F 16/00 | (2019.01) |
| G06F 16/33 | (2019.01) |
| G06N 5/02 | (2023.01) |
| G06N 20/00 | (2019.01) |
| G06Q 10/00 | (2023.01) |
| G06Q 10/06 | (2023.01) |

(52) U.S. Cl.
CPC ........... *G06N 5/02* (2013.01); *G06F 16/3334* (2019.01); *G06F 16/3347* (2019.01); *G06N 20/00* (2019.01); *G06Q 10/00* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 8,163,896 B1 * | 4/2012 | Bentwich | ........... | C07K 14/4702 |
| | | | | 536/23.1 |
| 8,214,238 B1 * | 7/2012 | Fairfield | ............ | G06Q 30/0203 |
| | | | | 705/7.29 |

OTHER PUBLICATIONS

Erkka Jalonen. May 30, 2007. Portfolio Decision Making in Innovation Management.*

* cited by examiner

*Primary Examiner* — Tuankhanh D Phan
(74) *Attorney, Agent, or Firm* — Fresh IP PLC; Clifford D. Hyra; Aubrey Y. Chen

(57) ABSTRACT

A system and methodology which can effectively provide decision makers with a better means of making decisions in a way that greatly improves the availability, reliability, and relevance of the information which they provide and use to make decisions. The system and methodology facilitates maximizing mutual utility in the context of a mutual decision between multiple users and groups of users identified generally as Parties and Counterparties and performs user specified actions based on meeting mutual threshold parameters. The system provides significant technical advantages over the prior art in that it uses helps Parties and Counterparties identify optimal arrangements and configurations with less errors, fewer computational cycles, less storage medium, and a smaller amount of time than would be possible using prior art systems.

15 Claims, 16 Drawing Sheets

FIG. 7

Entity Utility Rankings for Each Survey

Entities (e)

| Entity Surveys ($e_s$) | 1 | 2 | 3 | 4 | 5 | 6 | Utility of Entity Survey ($e_s$) Unsorted | | Sorted |
|---|---|---|---|---|---|---|---|---|---|
| $1_1$ | 0.3 | 0. | 0.5 | 0. | 0.1 | 0. | $1_1$ | 0.386 | $6_3$  1.16 |
| $1_2$ | 0.2 | 0. | 0. | 0. | 0. | 0.3 | $1_2$ | 0.116 | $2_2$  0.716 |
| $1_3$ | 0.1 | 0. | 0. | 0. | 0.5 | 0. | $1_3$ | 0.129 | $5_1$  0.603 |
| $2_1$ | 0. | 0.1 | 0.2 | 0.1 | 0. | 0.3 | $2_1$ | 0.077 | $4_2$  0.397 |
| $2_2$ | 0. | 0.8 | 0. | 0. | 1. | 0. | $2_2$ | 0.716 | $1_1$  0.386 |
| $2_3$ | 0. | 0.4 | 0.6 | 0. | 0. | 0.1 | $2_3$ | 0.219 | $5_3$  0.304 |
| $3_1$ | 0. | 0. | 0.1 | 0. | 0. | 0.1 | $3_1$ | 0.286 | $3_3$  0.292 |
| $3_2$ | 0. | 0. | 0.1 | 0.1 | 0.1 | 0. | $3_2$ | 0.046 | $3_1$  0.286 |
| $3_3$ | 0.5 | 0. | 0. | 0.8 | 0. | 0. | $3_3$ | 0.292 | $6_2$  0.236 |
| $4_1$ | 0.1 | 0. | 0. | 0.1 | 0. | 0.2 | $4_1$ | 0.099 | $2_3$  0.219 |
| $4_2$ | 0.2 | 0. | 0. | 0. | 0. | 0. | $4_2$ | 0.397 | $6_1$  0.171 |
| $4_3$ | 0. | 0.9 | 0. | 0. | 0.5 | 0. | $4_3$ | 0.036 | $1_3$  0.129 |
| $5_1$ | 0.1 | 0. | 0. | 0. | 0.2 | 0.3 | $5_1$ | 0.603 | $1_2$  0.116 |
| $5_2$ | 0. | 0.5 | 0. | 0. | 0.1 | 0.4 | $5_2$ | 0.069 | $4_1$  0.099 |
| $5_3$ | 0. | 0. | 0.3 | 0.1 | 0. | 0.2 | $5_3$ | 0.304 | $2_1$  0.077 |
| $6_1$ | 0. | 0. | 0. | 0.1 | 0. | 0. | $6_1$ | 0.171 | $5_2$  0.069 |
| $6_2$ | 0.4 | 1. | 0. | 0.5 | 0. | 0.2 | $6_2$ | 0.236 | $3_2$  0.046 |
| $6_3$ | 0.3 | 0. | 0.4 | 0.5 | 0.3 | 1. | $6_3$ | 1.16 | $4_3$  0.036 |

Weights of Entity Rankings ($w_e$)

| $w_1$ | $w_2$ | $w_3$ | $w_4$ | $w_5$ | $w_6$ |
|---|---|---|---|---|---|
| 0.223 | 0.256 | 0.225 | 0.176 | 0.081 | 0.039 |

Example of Possible Survey Hierarchy

1) Decision Description
   a) Category Survey
      i) Question 1: Response Type Numerical
      ii) Question 2: Response Type Binary Choice
      iii) Question 3: Response Type Categorical
      iv) Question 4: Response Type Descriptive
      v) Question 5: Subcategory Survey
         (1) Subcategory Survey
            (a) Question 1: Response Type Numerical
            (b) Question 2: Response Type Binary Choice
            (c) Question 3: Response Type Categorical
            (d) Question 4: Response Type Descriptive
            (e) Question 5: Subcategory Survey
               (i) Subcategory Survey Questionnaire
                  1. ...

ASYMMETRICAL MULTILATERAL DECISION SUPPORT SYSTEM

This application is a continuation of U.S. application Ser. No. 15/649,267 filed Jul. 13, 2017, which is a continuation of U.S. application Ser. No. 14/402,881 filed Nov. 21, 2014, now U.S. Pat. No. 9,727,640, which is a 371 of PCT/US13/42787 filed May 27, 2013, which is a CIP of Ser. No. 13/480,529 filed May 25, 2012 now U.S. Pat. No. 8,560,478, which are incorporated herein by reference in their entirety.

FIELD OF THE INVENTION

The present invention is directed generally to decision support systems, and, more particularly to systems and methodologies for implementing mutual decision making solutions in an effective manner.

BACKGROUND OF THE INVENTION

Considerable problems arise in performing decisions involving more than one participant. Among the problems that exist are the availability (or lack thereof) of information, the reliability of that information, and the relevance of that information to the needs of the decision makers. If the information fails in one or more respects it is highly likely that a suboptimal decision will be made.

All decisions essentially rely on the ability of participants to predict the outcomes of the decision from the inputs of the information which led to the decision. While the abilities of various participants is not something that can likely be addressed through technology the availability, reliability, and relevance of information which facilitates those decisions can be addressed through the use of technology.

There are several features of information systems which lead to information being unavailable, unreliable, and irrelevant. These features prevent predictions (and thus successful decisions) from being able to be made effectively by decision makers. In general these undesirable results arise from one or more of the following categories of constraints: (i) unavailable information, (ii) unreliable information and (iii) irrelevant information. These three categories of constraints can be effectively described as information limits.

In contexts where information is limited, decision makers often have to accept one of three bad options: (i) a high number of errors resulting from unavailable information (type I errors) or (ii) a high number of errors resulting from unreliable errors (type II errors); or (iii) the decisions made are significantly suboptimal by virtue of information and coordination failure between decision participants. Type I errors limit the downside of a potential decision but at the expense of a heavily restricted pool of decision candidates-which decreases the probability that a really good decision can be made. Type II errors result in potential decisions are not restricted to a narrow pool; however that liberality comes at the cost of a higher probability that a truly bad decision has unknowingly been made. In each case, the decision maker's interests are not best served as the result of the limited information. The last option exists because decision makers aren't able to identify the variant arrangements which could maximize the value of a decision. Consequently the results of the decision process are suboptimal to what they could have been.

There are several contributing factors for why information might be limited in the context of a mutual decision needing to be made. First, the more information a party or shares with the market regarding their specific interest, the greater the number of impostor counterparties appear masquerading as counterparty candidates which can meet that interest. Thus a party is reluctant to share a wide scope of information. Second, the more information a market participant shares with the market, the greater the information which is available for competing participants to use against them, further incenting participants to not share information. Lastly, the more information a participant shares with counterparty participants the greater leverage a counterparty participant has against the participant.

In addition, there are several problems which exist which make information sharing and processing uneconomical for participants. For example, decision counterparts don't know the scope of the domain of information which is critical for other participants to understand in order to make a decision so they consequently provide large amounts of irrelevant information which is very costly for participants to provide. Further, there isn't a common medium of gathering and communicating contextually similar information from decision participants who can provide that information to decision participants who need that information in order to effectively compare decision alternatives to make a good decision. Another problem is that information that is shared by counterparty participants is often too voluminous to be effectively processed. This information usually requires substantial additional time and energy to process, filter, sort, and relate in order to make it useful for a decision. Further, information provided by market participants often contains several inaccuracies which make it unreliable. In order for participants to make the information reliable, significant time and energy must be spent verifying and cross-checking information for inaccuracies so that the information a participant uses is reliable enough to use for a decision.

A brief sampling of examples of situations where bilateral and multilateral decisions occur is as follows: (i) employment decisions between potential employers and potential employees, (ii) servicing and contracting decisions between service providers and contractors, (iii) real estate purchase or lease decisions made between owner/lessors and possibly an owner/lessor's agent, and buyer/lessees and a buyer/lessee's agent, (iv) industrial equipment decisions made between equipment providers and equipment users, (v) financial investment decisions made between financial services agents and investors, and (vii) supply chain decisions made between designers, suppliers, integrators, logistics providers, and customers.

In each of these decisions all counterparties and parties involved in the decision are engaged as stakeholders. Also involved are those that each party or counterparty has designated to help them either (i) perform an evaluation or (ii) provide information associated with the decision. In connection with each of these decisions, each party seeks something that is typically only provided by another party. Consequently, the preferences which the parties have do not exist in a symmetrical fashion such that counterparty interests can reasonably align with one another or be compared with one another in meaningful way because even when interests do coincidentally align in one respect, the alignments of other preferences to attributes do not meaningfully align-meaning that in the aggregate there is no meaningful alignment of interests.

Beyond these practical challenges, there are also significant technical challenges which exist in the prior art which have not been previously addressed. First among these is the significant number of computer cycles which are necessary for decision support systems to perform various functions. These functions include, but are not limited to: (1) survey generation, (2) survey scoring, (3) survey reporting, (4) survey administration, (5) data entry, (6) record creation, (7) data querying, (8) data evaluation, (9) scoring, (10) ranking, (11) sorting, (12) messaging, and (13) event triggering. Systems that require more computer cycles to perform these functions require greater resources-including a larger number of computer processing elements, more electrical power consumption, and more space on electronic storage mediums in order to process such information.

Secondly, these systems require significant storage medium capacities in order to process information. This is particularly acute with regard to multilateral decision support systems. The prior art decision support systems aggregate tremendous numbers of records and use significant storage resources, where information is stored to a storage medium. Within the domain of storage of data for decision support systems these systems also collect information which is often of low-value compared to storage and maintenance costs of that information. This is primarily the result of either the redundant collection of information or the failure of system design to select only information which primarily has high-value to be collected.

Thirdly, another failing of conventional decision support systems in this area is that they may have very long temporal slack-periods between critical data inputs and the delivery of a final result which can be utilized in decision making. Fourth, many decision support systems are severely limited in their ability to identify optimal arrangements of Party-to-Counterparty arrangements due to the fact that their processes either, (1) involve scoring based only on preferences without consideration of attributes, (2) base their scoring only on the presence or absence of attributes without relation to the preferences of decision participants, (3) utilize unilateral evaluation where the preferences or attributes of either Parties or Counterparties are utilized as a decision criterion, and/or (4) suffer from a design that does not provide sufficient flexibility to address either: (a) the rapid changes in the needs of decision participants, (b) the most relevant needs of decision participants, and/or (c) all of the various different types of information which are needed by different types of decision participants for a given type of decision.

SUMMARY OF THE INVENTION

It is thus a primary object of the invention to provide a system and methodology that addresses the shortcomings of the prior art as discussed above.

It is another object of the present invention to provide a system and methodology which supports efficient decision making based upon the information available to the parties involved in the decision making process.

It is a further object of the present invention to provide a system and methodology to employ surveys containing attribute levels to develop utility functions which aid in making the most effective decisions.

It is a still further object of the present invention to provide a system and methodology which results in decisions which take into account mutual preferences of parties involved in the decision so as to promote decisions which maximize the attributes desired by the collective set of parties.

It is a further object of the present invention to provide a system and methodology which minimizes the number of computer cycles, data entries, survey administrations, record creations, space required to store records, and the temporal distance between critical system events. The reduction in these aforementioned directly and indirectly reduces resource consumption which are required by a system to support decisions-namely, they reduce the need for extensive computational resources, space on storage mediums, and idle resource time where computing resources can be utilized in decision making. The fact that fewer of the above resources are used has a net result of requiring fewer physical processing units, less power consumption, less electronic storage medium use, and less overall time for the system to perform decision support.

A primary objective the invention disclosed herein is a system and methodology which can effectively provide decision makers with a better means of making decisions in a way that greatly improves the availability, reliability, and relevance of the information which they provide and use to make decisions. The system and methodology facilitates maximizing mutual utility in the context of a mutual decision between multiple users and groups of users identified generally as Parties and Counterparties and performs user specified actions based on meeting mutual threshold parameters.

The disclosed system works by requiring that each user represent an entity and that each entity acts both as a survey respondent and as survey evaluator. In this way each user/entity acts in the role of both a Party and a Counterparty. It should be understood that between two or more entities it is not relevant which role is performed first in order for the system to perform its functions properly.

In one embodiment, the invention provides a means whereby a first set of Parties provide a series of attribute surveys to first set of Counterparties. A second set of Parties (which also function as the first set of Counterparties) evaluates a second set of Counterparties (which also function the first set of Parties). In each case, each set of Counterparties completes a set of Parties' surveys by providing attribute levels for a given attribute survey as Survey Responses.

The attribute surveys provided by the first set of Parties is asymmetrical with respect to the attribute surveys provided by the second set of Parties-meaning that the surveys do not "mirror" one another nor do they necessarily relate to the same attributes. This design overcomes the problem of requiring a formal setup and design by an expert system designer and also overcomes the very narrow range of applicability which hinders the prior art.

According to a preferred embodiment of the invention, the system provides that each acceptable arrangement of Parties indicate their preferences for Counterparty responses at various attribute levels for various attributes through responding to forced-choice surveys. Through application of conjoint analysis a utility function is derived giving each Party's preferences for a given set of Counterparty's attributes at a given attribute level. The utility function provides not just each Party's preferences for each attribute level at each attribute but it also provides each Party's preferences for various attributes relative to one another and the preferences for various entities relative to one another which possess those attribute levels at each attribute in various arrangements.

One unique aspect of the present invention is that it mutually evaluates the preferences of Parties for the attribute levels of the attributes of Counterparties for each role in a decision as opposed to evaluating only the preferences of Parties against the preferences of Counterparties or otherwise unilaterally evaluating the preferences of Parties for the attribute levels of the attributes of Counterparties.

This provides the advantage of extending the range of possible arrangements to which a conjoint analysis or other preference elicitation method can be applied in order to create a vastly larger number of mutually beneficial arrangements between Parties and Counterparties acting in various counterpart roles.

An additional unique aspect of the present invention is that it allows both Parties and Counterparties to incorporate within their evaluations and responses respectively the evaluation of Co-evaluators and Co-respondents in each case which provides for a multilateral arrangement of evaluation and response which is more encompassing than those which exist in the prior art because the decision support system incorporates a greater degree of decision participants which act as stakeholders in any decision than is available in the prior art.

An evaluation is performed wherein each Entity participating in a decision, acting in a first role, evaluates each Entity participating in the same decision, acting in a second role or other role. Likewise each Entity acting in a second or other role evaluates each Entity acting in a first or other role. This mutual evaluation of Entities in roles can be performed for as many roles as there are for each decision.

Accordingly, a first evaluation is performed wherein an Entity acting in a first role, which we here identify as a Party, evaluates an Entity acting in a second or other role, which we here identify as a Counterparty. The Party's utility function is evaluated at each Counterparty's attribute levels for each attribute. The result of all these evaluations for each Counterparty's attributes is aggregated to yield a total utility which the Party has for a Counterparty.

Likewise, a second evaluation is performed wherein an Entity acting in a second or other role, which we here identify as a Party, evaluates an Entity acting in a first role, which we here identify as a Counterparty. The Party's utility function is evaluated at each Counterparty's attribute levels for each attribute. The result of all these evaluations for each Counterparty's attributes is aggregated to yield a total utility which the Party has for a Counterparty.

If more roles exist for a given decision additional role evaluations are performed wherein each Entity acting in a given role performs the function of a Party by evaluating each other counterpart Entities acting in counterpart roles, which likewise perform the function in each case of a Counterparty.

The combined total of each mutual arrangement of evaluations of Entities acting in counterpart roles is totaled for each arrangement. The result of these evaluations is a list of mutual utility preferences-for-attribute values where each Party has given each Counterparty a utility score for each mutual arrangement. For each unique combination of Party and Counterparty arrangements a single resulting utility value exists which can be provided to users as an index of mutual utility values which exist between any arrangement of counterpart Entities involved in a decision where the Entities act in counterpart roles. These values are provided to users as a sorted list of mutual utilities. This means that if there were 30 first Entities acting in a first role and 50 Entities acting in a second role and each acceptable arrangement consisted of only one Entity in a first role and one Entity in a second role then the resulting list would consist of 1500 unique combinations of arrangements from which users would select the best arrangements for themselves. Accordingly if there were three counterpart roles where there were 30 Entities in a first role, 50 Entities in a second role, and 12 Entities in a third role where there would only be one Entity selected from each role, then the resulting list would consist of 18000 unique combinations of arrangements from which users would select the best arrangements for themselves.

Users of the system can utilize mutual preference-for-attribute utilities in order to make better decisions by performing comparative evaluations that would be infeasible for humans to perform alone. These mutual preference-for-attribute utilities are employed in order to perform a series of actions which have been designed by each Party if a given set of threshold conditions are met.

By way of example and not of limitation, the teachings of the present invention can be applied in the context of the requirement for a mutual decision of a potential employer acting in a first role and that of a potential employee acting in a second role. This invention can be applied to such employment decisions where labor can be identified as a first role and management can be identified as a second role respectively making an employment decision in each role where the action which might be taken would be to execute an employment contract.

As just another example, this invention can be applied to contracting and/or servicing decision where a contractor and/or service recipient can be identified as a first role and a subcontractor and/or service provider can be identified as second role, respectively, in a contracting and/or servicing decision where the action performed would be the submission and acceptance of a proposal respectively. In similar fashion, this invention can also be applied to an industrial equipment decision where a provider of industrial equipment could be identified as first role and the user of the industrial equipment could be identified as second role, respectively, in an industrial equipment decision where the action might be the sharing of information for the creation of an agreement.

The teachings of the present invention could also used to facilitate decisions between buyers and sellers in a transaction decision of personal property, real estate, financial instruments or intellectual property where the buyer would be the first role and the seller would be the second role, respectively, in a transaction decision. Furthermore the invention could also be used to facilitate mutual selection or communication decisions between institutions and individuals, groups and individuals as well as one individual and another individual where in each case the former would be considered a first role and the latter would be considered a second role respectively in a selection decision.

The applicability of the invention is not limited to merely arrangements of two role counterpart pairs. A mutual decision may involve several Parties and Counterparties role arrangements in any given arrangements such as a supply chain involving several suppliers, integrators, distributors, and retailers, all within one or more supply-chain decisions where a number of various role relationships beyond merely two exist.

In connection with any mutual decision, either Entity is a Party and Counterparty and can effectively be identified as either a first role or second role. Thus, the rest of this disclosure will simply refer to each Entity by the role in which they are acting as either Party and Counterparty in each case unless additional clarification is needed.

BRIEF DESCRIPTION OF THE DRAWINGS

FIG. 7 is an illustration of an exemplary survey relevance scoring evaluation;

FIG. 8 is an illustration of an exemplary survey hierarchy;

FIGS. 10A and 10B is an illustration of an example of row and column evaluations which are performed such that Evaluators rate the Survey Responses of certain attributes in the row evaluation and Entities in the column evaluation;

DETAILED DESCRIPTION OF THE INVENTION

Figure 1:
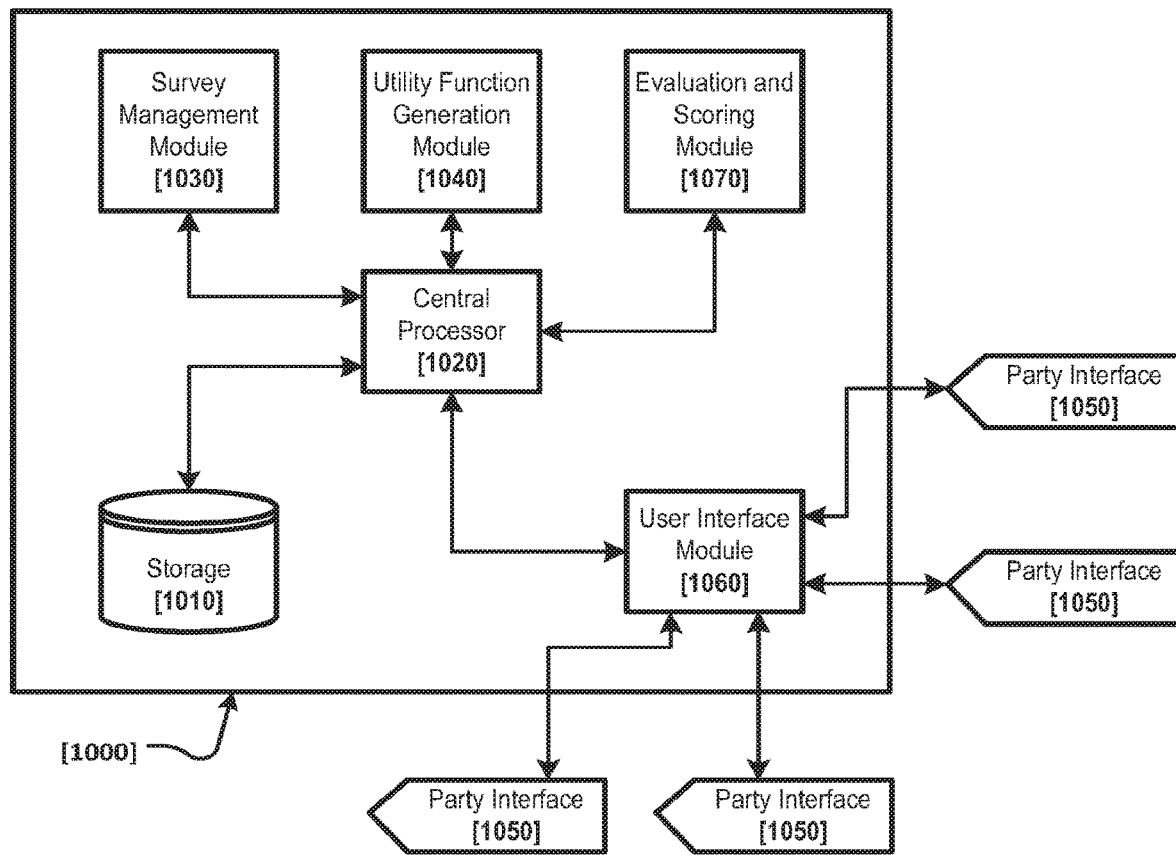
FIG. 1 is diagram depicting the major components of the system of the present invention in a preferred embodiment thereof.

In connection with the following disclosure, the following definitions and notational conventions will be used:

A. Definitions

User: Is a natural person who uses the system by interacting with one or more elements of the interface of the system.

Attribute: Is a characteristic of a tangible or intangible object consisting of its real or perceived qualities.

Attribute Level: Is a quantitative, qualitative, descriptive, binary or categorical value that is associated with an Attribute.

Entity: Is an object which can be engaged in a transaction of mutual value, comprising of an individual, or a collection of individuals, or an organization, or collection of organizations and one or more and tangible or intangible goods, services, or qualities which can be transacted.

Party: Is a classification which identifies an Entity member of a first class which evaluates a second class of Entities (Counterparties). A Party can be thought of as any Entity which is a subject which performs evaluations of members of object Entity class (Counterparty). It should be noted that because the evaluation of Entities is mutual Entities can be simultaneously be members of the classification of Party, which evaluates, and of Counterparties, which are evaluated.

Counterparty: Is a classification which identifies an Entity as member of a second class of Entities which is evaluated by a member of a first class of Entities (Parties). A Counterparty can be thought of as any Entity which is evaluated by a member of a subject Entity class (Party).

Evaluator: Is a User which is a member of a Party or Co-Evaluator classification that evaluates one or more Counterparties or survey responses.

Co-evaluator: Is a User associated with a Party which assists in the evaluation of one or more Counterparties or survey responses.

Respondent: Is a User which is a member of a Counterparty or Co-Respondent classification that responds to one or more surveys.

Co-respondent: A User that provides information either related to a Counterparty or in behalf of a Counterparty by verifying, improving or completing one or more surveys.

Survey Response: Is a response made by a Respondent to one or more Party surveys which indicates an Attribute Level of an Attribute. A Survey Response may also include an Attribute Level datum or data for an Attribute which is provided by a Counterparty or Co-Respondent directly over a communication network which is acting in the role as a Survey Response but which may not strictly be a response to a survey provided by the system.

Dummy Responses: Is a response presented to an Evaluator designed to elicit a preference which contains dummy variables where no real data is present.

Preference Response: Is a response which yields a preference evaluation of one or more of the following in response to a Survey Response or Dummy Response: (i) an attribute level with respect to other attribute levels within a given attribute category, (ii) an attribute with respect to other attributes, and (iii) a collection of attributes with respect to other collections of attributes.

Utility Function: A set of one or more mathematical functions which predicts the utility value which a Party or Evaluator would assign a given Survey Response, set of Survey Responses, Attributes, Attribute Levels, set of Attributes, or set of Attribute Levels from a set of Preference Responses which a Party or Evaluator has provided.

B. Notational Conventions

There are several mathematical representations throughout this disclosure. The first is the representation of a generic variable of any kind which is represented as a bracketed bullet, (•). These bullets serve as placeholders for other variables such that the other notational conventions can be explained. Several different kinds of variables are provided throughout the disclosure. Variables belonging to the class of Parties are noted as variables without hats (•) and variables belonging to the class of Counterparties are noted with hats (•̂). For the purposes of clarity, the variable (e) is identified an Entity which is a member of a Party whereas (ê) is an Entity which is a member of a Counterparty. When discussing variables, (brackets) and italicized letters are generally used to identify them if they appear within text.

To further distinguish types of variables the convention of the over-script prime, ($\acute{•}$), and over-script double prime, ($\acute{\acute{•}}$), are used in order to identify differences between Respondents and Evaluators. Respondents and Co-Respondents are identified by an over-script prime ($\acute{•}$) and Evaluators and Co-Evaluators are identified by an over-script double prime ($\acute{\acute{•}}$).

Within the disclosure, the notation ($Q_{e_s}$) is used to identify the surveys requested by Parties for Respondents to complete. The (Q) identifies that the variable is a survey and the subscript (e) identifies the Entity source and the sub-subscript (s) identifies the survey number from a given Entity. Thus ($Q_{15_3}$) represents survey number 3 of Party Entity number 15.

With reference now to FIG. 1, the system of the present invention, in a preferred embodiment thereof, is now described. System 1000 is preferably a computer based system for implementing the functionality of the present invention as described in greater detail below. While an exemplary architecture is described, it will readily be understood by one of skill in the art, that an unlimited number of architectures and computing environments are possible while still remaining within the scope and spirit of the present invention.

Preferably, a number of Party Interfaces 1050 are made available for User use so that such Users can interact with System 1000 as described below. Party Interfaces 1050 may be any devices as is known in the art that allow User input and the ability for the User to receive data, information and reports from System 1000 as well as to interact with System 1000. By way of example and not by limitation, Party Interfaces may be laptop or desktop computers or terminals, or mobile devices such as tablet computers, smartphones and the like. Communication between such Party Interface devices 1050 and System 1000 may be via a wireless connection or via a wired connection as is known in the art. Party Interfaces 1050 may be geographically dispersed and there may be a large number thereof so as to allow a large number of Users associated with various Entities to interact with System 1000 as desired or as necessary.

Processing associated with interacting with Users via Party Interfaces 1050 is generally managed by User Interface Module 1060. Such functionality may include receiving and formatting responses and requests from Users via Party Interfaces 1050, generating graphical user interfaces for display on Party Interfaces 1050 and managing and soliciting User input as required by the functionality of System 1000.

User Interface Module 1060 (as well as each of the other key modules described below) communicates with Central Processor 1020. Central Processor 1020 provides primary operational control over all processes and functionality implemented by System 1000. Central processor 1020 (and some or all of the other components described herein in connection with System 1000) may be implemented as a server based computing platform which is robust and readily expandable as processing requirements expand. Central Processor 1020 also communicates with Storage 1010 for storing and retrieving data as generated and as needed by System 1000 to implement the teachings of the present invention as described more fully below. Storage 1010 may be any suitable storage functionality as is known in the art, such as for example, disk based storage that provides sufficient data capacity and readily available access to data as needed.

Survey Management Module 1030 also interacts with and is under the control of Central Processor 1020. Survey Management Module 1030 provides all functionality associated with soliciting input from Users as required in connection with the generation, modification and communication of surveys between and among Users associated with various Entities as more fully described below. Utility Function Generator 1040 communicates with Central Processor 1020 and serves to manage all processes associated with generating utility functions based on Entity preferences and survey attributes and responses as more fully described below.

Finally, Evaluation and Scoring Module 1070, under the direction of Central Processor 1020, manages and implements all processes associated with the evaluation of Parties/Counterparties in connection with the decision support functionality described in detail below.

Now that the system and related components of the present invention have been described, the following provides a detailed disclosure of the processes and functions of the present invention in a preferred embodiment thereof.

1: Select Decision & Role

Figure 2:
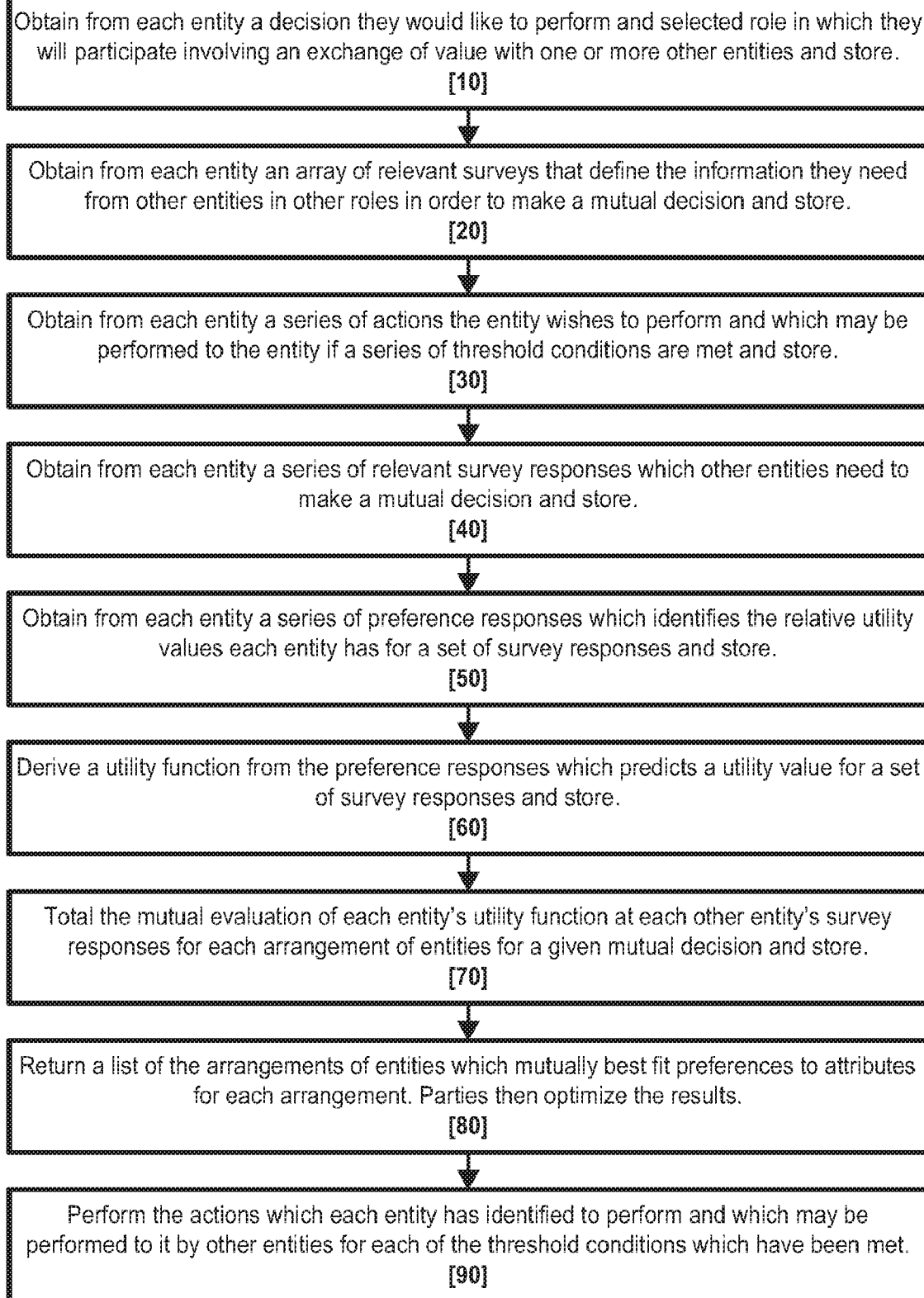
FIG. 2 is a flowchart illustrating the methodology of the present invention at a high level in a preferred embodiment thereof.
Figure 3A:
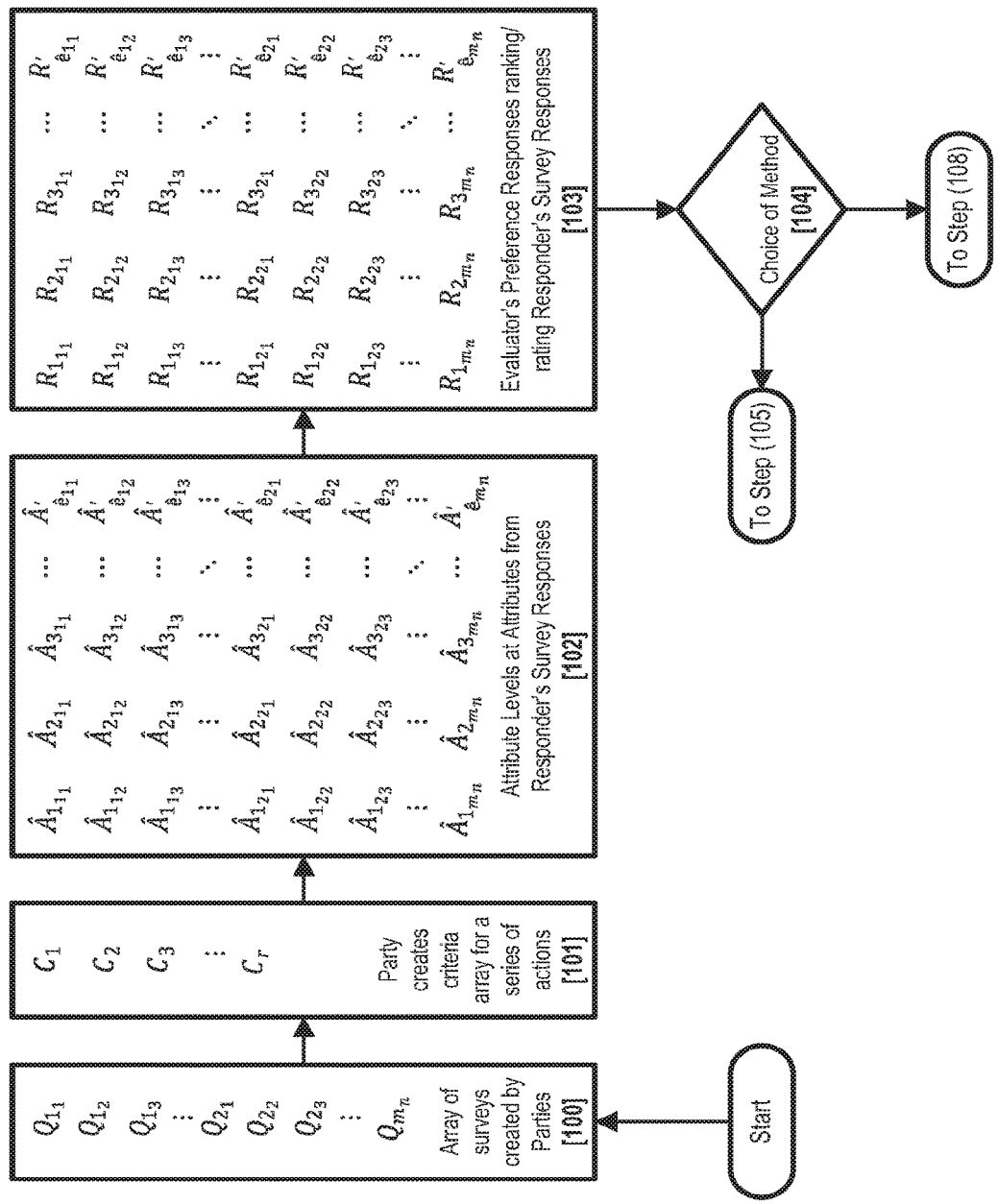
FIGS. 3A and 3B provide a general mathematical overview of the major functions of the system of the present invention in a preferred embodiment thereof.
Figure 3B:
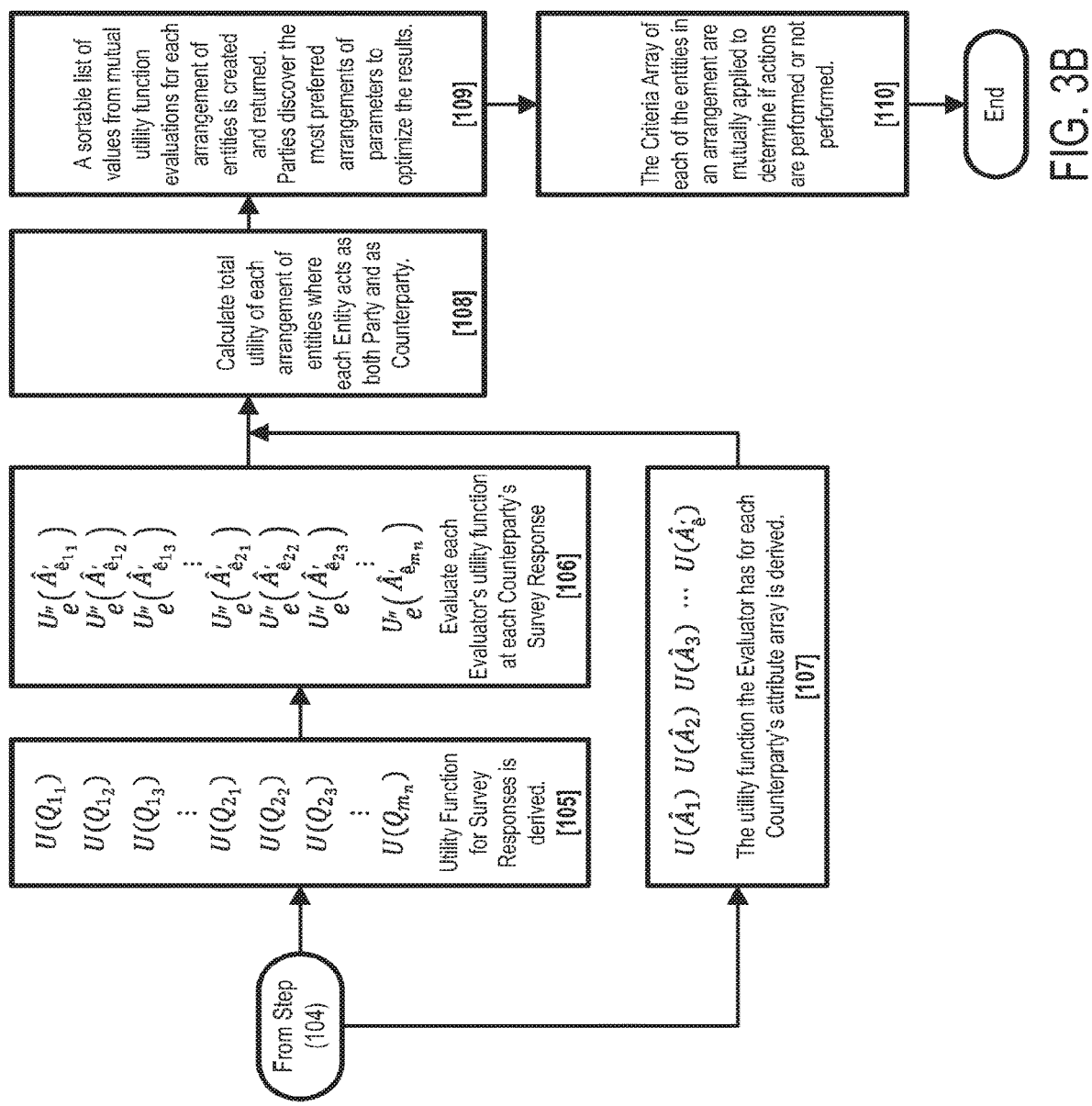
Figure 4:
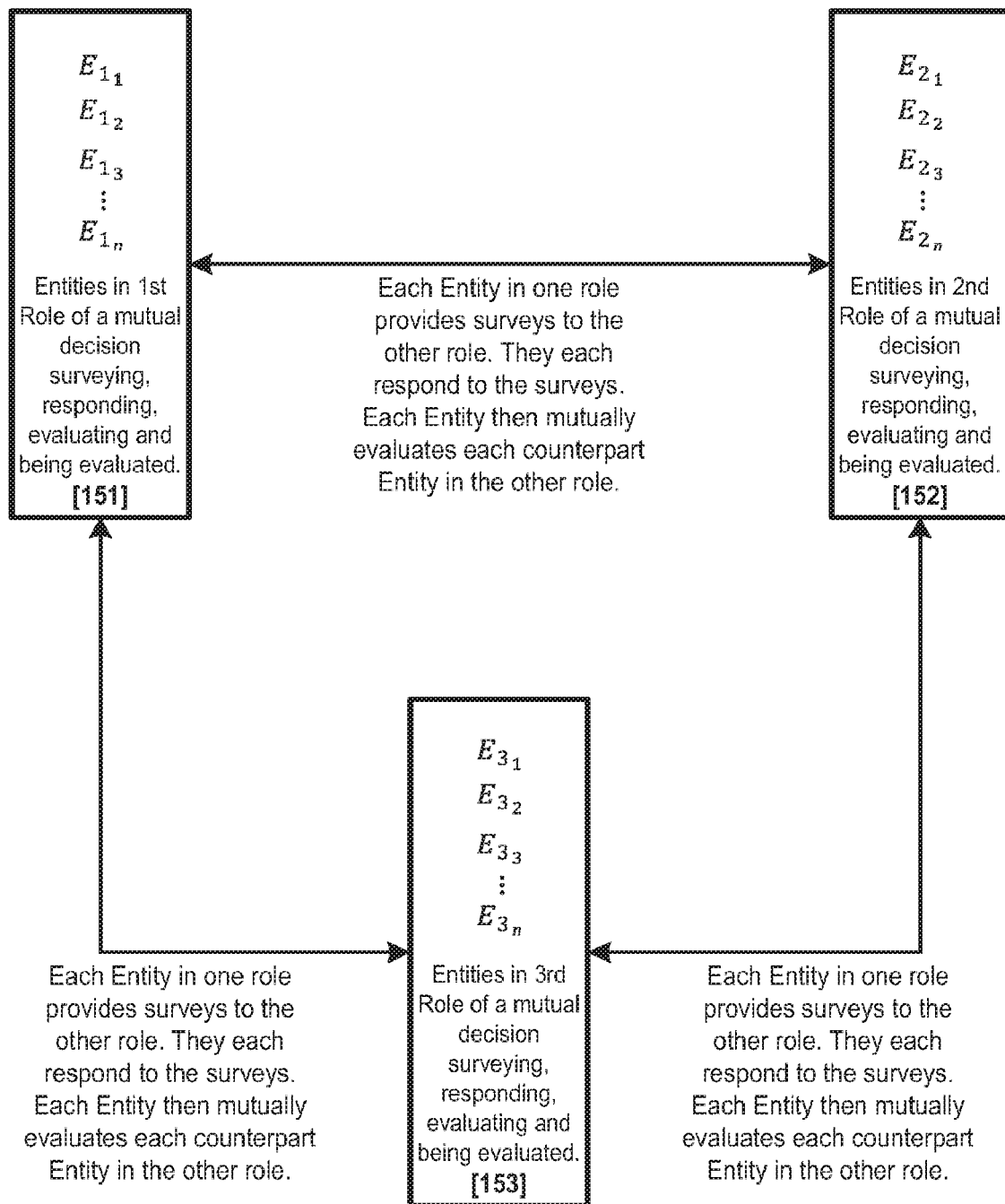
FIG. 4 is an illustration showing the relationship of various Entities acting as Parties and Counterparties to one another and in various roles in connection with a given decision.

With reference to FIG. 2 (which provides an illustrative overview of the primary functionality of the present invention) along with FIG. 3A and FIG. 3B (collectively FIG. 3) and FIG. 4, the high level operational elements of the present invention are now described.

At FIG. 2 [step 10], System 1000 provides the Parties with a means of performing a decision using one or more computing devices over a communications network. A selection of decisions and roles are made available for Users to search and select. Once one or more decisions and roles have been selected, other Entities select the same decisions and counterpart roles necessary to make a decision.

This selection is performed first by Users conducting a search of decisions and roles which are available to be selected from an existing list of available decisions and roles. Second, the list of decisions and roles is returned to the User and the User chooses either, (i) to select one or more existing decisions and roles which counterpart object Entities have defined which is compatible with the interests of the subject Entity, or (ii) create a new decision and assign for themselves a role and one or more counterpart decision roles which will be fulfilled by other counterpart Entities.

If (ii) has been selected, the details of that decision and its attendant roles are provided and are made available for other Entities to search, review and select. Third, other Entities select a decision and a role where one or more Entities have selected the same decision and a counterpart role necessary for all the roles within a given decision to be filled. Each counterpart role for each decision may be occupied by one or more Entities participating in a decision such that multiple Entities can participate in a given decision at any one time. It should be obvious to anyone skilled in the art that which Entities select which decisions or roles first is not important since either can be selected prior to the others. It should also be obvious to anyone skilled in the art that at any given period of time there may be several orphaned decisions which are waiting for decision role counterparts to select the same decision.

Step 10 is performed by first obtaining from a Party the decision the entity with which they are associated would like to make and the role that entity would like to play within that decision in addition to the roles that entity would like other entities to play in the same decision. These decisions involve more than one role in order for an exchange of value to take place within each decision. These decisions may be varied.

Some examples of decisions include but are not limited to: employment decisions, contracting and/or servicing decisions, real estate decisions, industrial equipment decisions, financial investment decisions, buyer and seller transactional decisions, personal property decisions, mutual selection decisions and communication decisions.

Decisions and roles related to them are described, selected, categorized, sub-categorized, and modified by decision participants such that no specific expert or existent classification of decisions is needed. This lack of an arbiter or a specified collection of standardized decisions which can be performed allows for the flexible configuration and reconfiguration of decisions to be made. The decisions may have a network structure with nodes and edges or alternatively a taxonomical structure with classifications and sub-classifications within a taxonomical tree such that individuals can discriminate between various types of decisions on the basis of the selection of various elements within the given decision structure.

The advantages of these various network and taxonomical structures are that they allow for useful elements of a set or subsets of decisions to be used in other decisions. Additionally the use of network and taxonomical structures within decisions allows for sets and subsets of decisions to be compared with one another in ways that increases the overall value of a given exchange.

In an example, a potential employer elects to perform an employment decision. He or she also selects a subcategory of an employment decision, which is mathematical computer programming decision. A potential employee also elects to perform an employment decision. He or she selects a subcategory of computer systems engineering programming (which is closely related to mathematical computer programming in this case). Because of the categorical structure of these decisions, certain elements which may be mutually beneficial to both a potential employer and a potential employee might be compared whereas they might not have been be obvious to either previously.

One illustrative overview in FIG. 4 helps to illustrate the relationship of the Entities to one another in a mutual decision. It should be obvious to one skilled in the art that any number of roles can be represented in this evaluation. FIG. 4 represents only three; however, any mutual decision may involve any number of roles greater than two and any number of entities acting in various roles.

Furthermore the sequence of these evaluations may be made in any order.

2: Get Party Surveys

With reference to FIG. 2 [step 20], the system of the invention allows Parties to encode their unique criteria for making a decision into two parts which can then be processed and analyzed by one or more computing devices in order to identify the ideal mutual arrangement between a Party and a one or more Counterparties. The two parts of the criteria that Parties encode are: (i) the information necessary for making a decision FIG. 3A [step 100] and (ii) the actual preferences which they have for and between various attributes and attribute qualities which are evaluated FIG. 3 [step 103].

These two criteria are provided to the System 1000 by Parties and Co-Evaluators. They provide this as (i) a set of surveys, FIG. 3A [step 100] applied to a given role, which are used for accumulating the responses from Counterparties and Co-Respondents which are then evaluated and as (ii) a series of preference responses, FIG. 3A [step 103], that capture the relative preferences which Parties and Co-Evaluators have for various attributes relative to other attributes at various attribute levels relative to other levels as well as preferences which Parties and Co-Evaluators have for entities which possess given sets of attributes at given sets of attribute levels. It should be noted that FIG. 2A [step 20] and FIG. 3 [step 100] correspond to the same activity and FIG. 2 [step 40] and FIG. 3A [step 103] also correspond to the same activity.

System 1000 provides a means for Parties to select and provide surveys to the system which are most appropriate to their individual needs. This mechanism provides Parties with the flexibility to acquire any information from a Counterparty without the need for the explicit input of a system designer in order to facilitate a decision. The benefit of this system over the prior art is that System 1000 reduces the aggregate number of survey administrations and data entries which need to be performed by the system in order to capture this highly valuable data. This reduces the number of computer cycles performed by the system by eliminating administration of duplicate surveys to Respondents. This further reduces the number of responses which are collected and stored, and subsequently the amount of storage which is necessary to store these responses in order for a decision support system to perform its function.

To further describe this technical feature in FIG. 3A [step 100], a Party encodes the information necessary for them to make a decision by selecting appropriate surveys for Respondents to complete for a given role. The notation used in the diagram of $(Q_{m_n})$ provides that (Q) identifies the variable as a survey, the subscript (m) identifies the entity which generated the survey and the sub-subscript (n) identifies the survey which among a number of surveys was generated by the entity.

Throughout this disclosure, surveys will be also be mathematically represented as where the (e) can be 1–m values and the (s) can be 1–n values:

$$Q_{e_s} \qquad [2.01]$$

Figure 5:
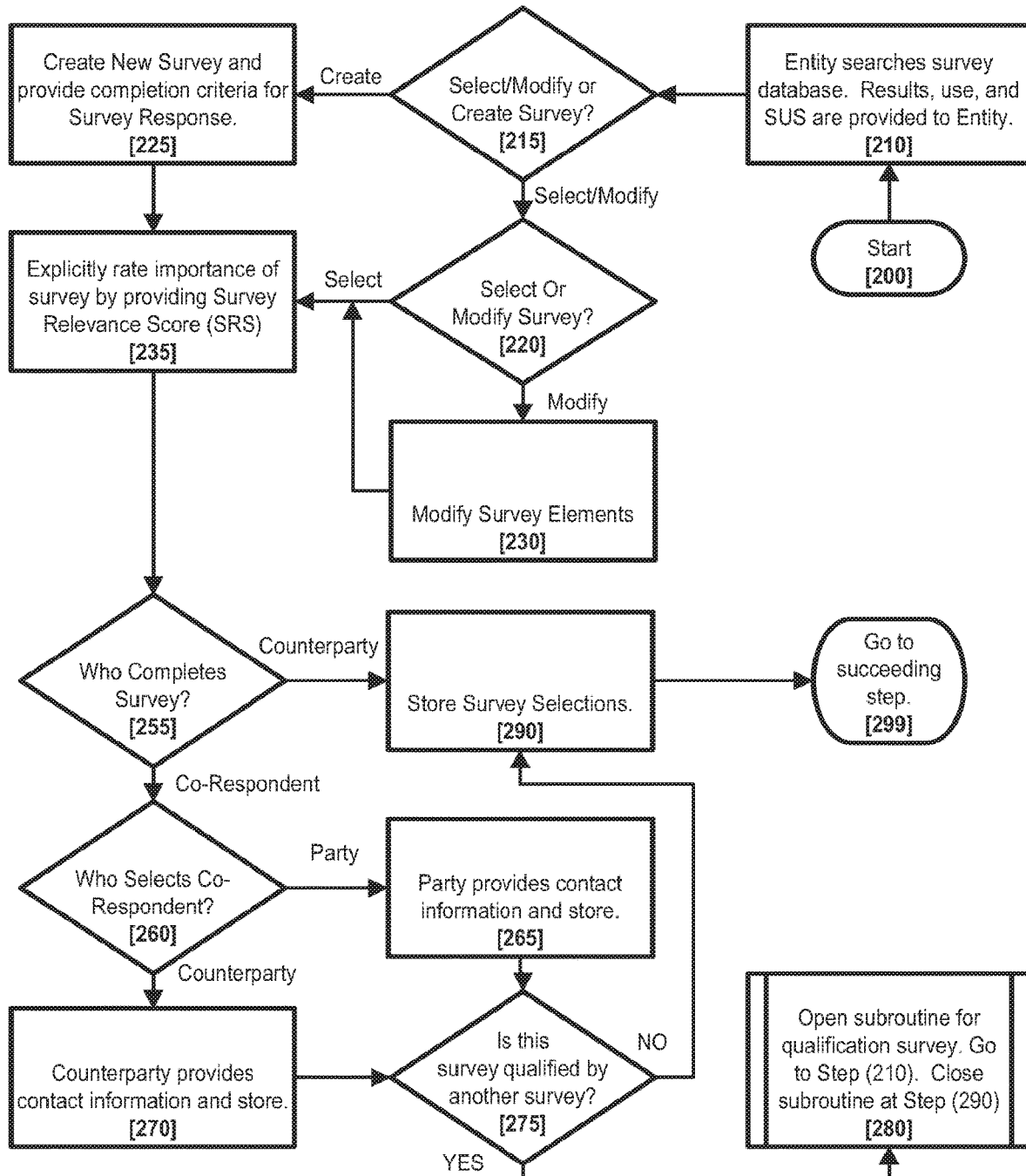
FIG. 5 is a flowchart illustrating the steps undertaken by the system of the present invention in connection with the Parties review, selection and creation of surveys for Respondents to complete according to a preferred embodiment of the present invention.

The block diagram of FIG. 5 illustrates the steps involved in creating a survey in more detail and outlines the module which provides the means necessary to reduce the number of computing cycles by a system and storage medium consumed by the system. The precise detail by which this reduction in resources is accomplished is identified in Section 4 and is further detailed in Equations [4.02, 4.03, 4.04 and Table 11].

At [step 210] Party Entities search a database for existing surveys which if answered may facilitate a decision. System 1000 returns a list of existing surveys to the Party from the query. Parties then review the descriptions of surveys which may be useful, along with the actual surveys themselves, and a SUS (survey utility score) for each survey for a given role and a given decision.

Parties perform this search in order to minimize the effort of creating new surveys (which can be time-consuming) and in order to encourage Parties and Counterparties to standardize the use of best-of breed surveys. Parties may create non-standard surveys by encoding the information they seek to obtain from Counterparties in one of three ways: (i) by selecting an existing survey which has been created by other Parties, (ii) by creating a new survey, or (iii) by selecting existing surveys and then modifying one or more of elements of the survey to better suit the specific needs of Party-effectively creating a new survey.

At [step 215] the Party, having reviewed the various surveys, determines if one or more of the surveys approximately meets his/her needs to uncover information which Respondents will provide. At [step 225] if the Party determines that no survey meets its general requirements then the Party undertakes to create a new survey. The Party specifies for the system the following elements of the survey: (a) the questions or queries which are posed by a survey, (b) the information presented to the Respondent for response (such as information which might provide a Respondent with context in order to provide the appropriate information in a response), (c) the data requirements for a response to considered valid (such as whether data is quantitative, qualitative, descriptive, binary or categorical), (d) what threshold conditions must be met in order for a given data entry to be considered valid by the system (one example of the aforementioned is a threshold condition exists where a Party wants only responses that include categories that are not "N/A" or "Blank"; another example would be that a response provided by a Counterparty that is not verified by a Co-Respondent would be considered invalid; another example would be that a response provided by a Co-Respondent which does not provide a valid auditing information and authentication for the Co-Respondent is not considered valid).

Within each survey there is an option to disclose information which is confidential to the Party. The disclosure of confidential information as part of the survey is accompanied by the ability which the Party has of defining the criteria for disclosing this confidential information to Respondents. If the Party defines confidential information within the survey they must also define the criteria for disclosing this information. The criteria for disclosure may include having completed another identified survey (such as a confidentiality agreement or a survey which verifies that they have an active security clearance). Examples of this kind of information may be in the case of a contracting decision where certain confidential information is necessary for Counterparties to understand the scope of the work and respond to the surveys appropriately. However, the Party and can only disclose the confidential information to relevant Entities that have completed a non-disclosure agreement. Relevant counterparties may therefore be required to meet a series of conditions which identifies them as having completed such a non-disclosure agreement prior to accessing the confidential information.

At [step 215] if one or more of the surveys provided does generally meet the Party's needs then they are selected by the Party to determine if the survey should be further improved in order to better meet the needs of the Party or whether it should be selected outright. At [step 220] if the Party determines the survey should not be improved, because the marginal value added by survey modification generally would not be greater than the value of the effort required in order to modify the survey then no elements of the survey are modified and the survey is selected as it is. At [step 230] if the Party determines the survey should be improved then it is modified. The modification of the survey modifies one or more elements which have been indicated above as elements of the survey. At [step 235] the Party then provides an explicit rating of the survey which numerically identifies its relative importance to other surveys.

At [step 255] the Party next determines the type of Respondent that should complete the survey. A survey can be completed by either a (i) a Counterparty or by (ii) a Co-Respondent. In some cases the response of a Counterparty provides more useful information than a Co-Respondent and in other cases the response of a Co-Respondent provides more useful information than a Counterparty. (For example in an employment decision, the response of a potential employee to a survey question, "Rate how easy others get along with this person from 0-9" is likely to produce different results depending on whether the prospective employee is asked versus that of a relatively objective co-worker. Likewise there are different responses which may be produced by Counterparties and Co-Evaluators in an investment decision where the roles of the decision makers are investor and broker. A response by a counterparty broker regarding the relative riskiness versus its returns for an investment would be different than that of a disinterested third-party analyst.)

At [step 260] if a Co-Respondent is selected to complete the survey then the Party next determines who will select the Co-Respondent. In some cases it is useful for a Party to select a Co-Respondent which must complete the Survey Response. (One such example might be a contracting decision where the Counterparty subcontractor needs to have security clearance in order to work on a project; the Co-Respondent might be the security clearance provider or clearinghouse that can verify the security clearance of the subcontractor. Another example for an employment decision might be where a Party potential employee would need a Counterparty employer to possess verification from a particular third-party ratings agency regarding the stability of a financial history before a certain employee would consider working for them.)

At [step 265] if the Co-Respondent is selected by the Party, then the Party provides the necessary contact information for the system to reach one or more Co-Respondents to complete the Survey Response. If the contact information necessary for collecting the Co-Respondent's survey response already exists within the system the Party may be able to select it [step 270]. In other cases it is useful for Counterparties to provide Co-Respondents which cannot conveniently be determined by the Party. (One such example might be for an employment decision where a Party wants a Co-Respondent to provide details regarding the specific educational background of the Counterparty but does not necessarily care from which education institution Survey Response is provided. Another example might be for a servicing decision where a Party contractor wants former clients of a subcontractor to rate the relative satisfaction they had in their dealings with the subcontractor but the Party contractor is not necessarily interested in which specific clients the subcontractor uses to complete the Survey Response.)

At [step 275] for each survey that a Party requests a Respondent complete, there is the option to have the survey be qualified by an additional subordinate qualification survey. The qualification survey provides a means of Parties qualifying the responses of Respondents such that the Survey Responses of one Respondent may be insufficient to make a decision and additional qualifying Responses may need to be provided in order for a Party to have adequate information to make a decision. (For instance in a an investment decision if a Party investor had a Counterparty investment company provide its entire financial statement within a survey that survey may by itself be insufficient because it cannot be verified. The Party would therefore create a qualifying survey which would have an auditor provide an audit opinion of the financial statements such that the Party could then make an investment decision. The state of the auditor's opinion would qualify the financial statement provided by the Counterparty Respondent. In another example in a Real Estate decision a Counterparty property owner might claim that a property has a particular zoning which allows for its development; however, the statement of the property owner alone might be inadequate for a Party to make a decision, therefore the statement of the property owner would need to be qualified by either a Co-Respondent government authority or an engineering firm which could verify the accuracy of those details.)

At [step 280] if the survey is qualified by another survey then the details of the qualifying survey would be entered just as the survey being qualified and would follow the same procedure, even allowing for subordinating qualifying surveys which would qualify it. At [step 290] if the survey is qualified no further by any qualifying surveys then the survey is closed and stored to a digitally programmable medium.

2A: Survey Optimization

One of the problems with allowing so many Parties to encode their unique decision criteria for Counterparties is that Parties will create an ever expanding number of surveys which Counterparties will have to complete. The problem with creating additional surveys which are proximally similar is that it burdens each Respondent with the task of completing each and every additional survey without providing marginal aggregate value per unit of effort. In fact it can make the decision process significantly less efficient for all participants merely because one decision participant desires to specify a small survey difference that may provide him/her with a marginal degree of value.

To combat this potential problem, two features which can collectively be referred to as a genetic optimization process are introduced which help minimize this problem.

These features have the technical effect of reducing the amount of data which needs to be stored by a decision support system on a storage medium as well as reducing the amount of computational power which is needed to administer surveys to respondents. This also facilitates the system to store only primarily high-value information. This is done in the following manner. First, a feedback system is employed to help Evaluators and Respondents coordinate the use of a limited set of surveys which approximates the greatest quantity of value for a finite degree of time and energy spent on any given decision. This consequently enables Entities to focus their time and efforts on selecting and completing only the surveys which are most useful for a given decision-which also reduces the number or surveys which need to be administered to Respondents and the amount of storage space which needs to be utilized in order to store the responses of Respondents. This feedback system employs (i) a Survey Utility Score (SUS) which identifies for Respondents both the relative value of a given survey relative to other surveys and the degree which a given survey is used by Evaluators and other Respondents, and (ii) information which relates to Parties the number or percentage of Respondents who have completed a given survey within a given decision and role population, which identifies for each Party how immediately useful a given survey will be. Second, the selection of the number of surveys is limited-meaning that a set of surveys which best meet the fitness criteria of both Evaluators and Respondents is provided. Accordingly, second, Parties are limited in the number of surveys they can select to have Respondents complete by a cost function which is applied to them by the system-meaning that the more surveys they request Respondents complete the greater the total cost that is applied to them. Respondents are likewise limited in the surveys they select, but for different reasons, because each survey they complete requires a degree of time, thought, and effort to complete. Consequently, it may be impractical to complete more than a certain number of surveys. Being able to select which surveys they complete and do not complete they have an incentive to complete the surveys they believe are the most relevant to Evaluators.

Together these two forms of feedback provide a measure of "fitness" which can be employed by each type of Entity as to evaluate for selection as well as a means of effective population reduction, which does not limit the actual population of surveys, but instead limits the population of useful surveys for any given period of time. Surveys which do not meet these fitness criteria for selection are iteratively depreciated through the feedback process and their selection is replaced with those that better meet the measures of fitness criteria. This evaluation for selection ultimately yields an optimal limited arrangement of Surveys for each role in a decision which can be collectively used by both Parties in order to undertake evaluation for a decision.

Figure 6:
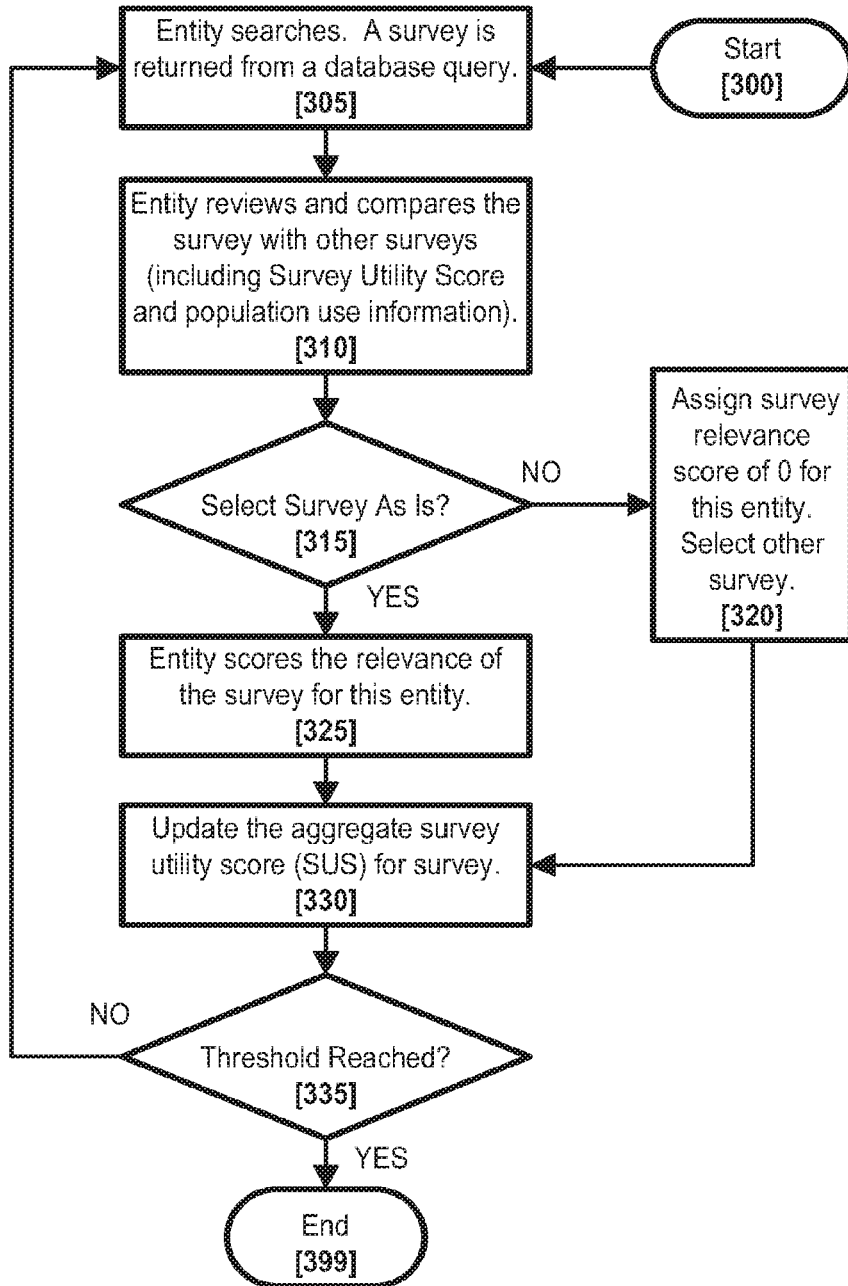
FIG. 6 is a flowchart illustrating the process of survey optimization whereby surveys are evaluated, promoted, and depreciated based on their relative relevance to the needs of both Parties and Counterparties.

This process is illustrated in the block diagram of FIG. 6 where [step 305] requires that a survey is returned from a database query the Entity has made. The survey returned from the database may be a list of surveys which are presented to the Entity and reviewed and compared in the following block simultaneously. At [step 310] the system identifies where the Entity is provided with both the survey content to review as well as the information which provides the relative fitness scores which other Entities have assigned to the Survey through selection and evaluation. These steps [305] and [310]correspond to FIG. 5 step [210]. At [step 315], for each Entity they must select for themselves whether to choose the survey relative to other surveys with the information they have been provided.

In the case of a Party selecting a survey, they are limited by selecting a finite quantity of surveys for Respondents to complete. This is the survey threshold identified in [step 335]. Evaluators must therefore budget their survey selections and choose the best surveys to select in order to yield the optimal results. In practice this means that Parties either select the survey on the basis that it provides better overall utility than other surveys, forego collecting the information which was identified by the survey-indicating to the system that the survey's utility value was lower than that of other available surveys.

In the case of Respondents, each respondent selects those surveys which best provide them with the greatest possible chance of achieving an optimal decision for a given level of effort they are willing to provide within the survey budget they are allocated At [step 320] in FIG. 6, if the survey is not selected an SUS of (0) is assigned to the survey from that entity and the Entity must select another survey. In the case of an Evaluator, [step 320] corresponds to steps [225] and [230] of FIG. 5, which provide the means of improving the pool of surveys which are available to a given population of Entities. These surveys must then be reviewed, selected, and evaluated in order to improve their relative "fitness" to the population through evaluation and use otherwise they are depreciated.

At [step 325], each Entity evaluates the survey for relevance and provides a singular value which identifies the perceived value of the utility of the survey related to all other surveys for the same role in the same decision. At [step 330], each time an Entity performs an action which may change the aggregate value of the SUS for a given survey it is revaluated by the system and a new SUS evaluation is computed. At [step 335], the system determines whether a given threshold value has been reached which limits further evaluation selection. If that threshold has been reached the system ends the evaluation for that Entity. If the threshold has not been reached the Entity may continue to search and select additional surveys.

2B: Survey Utility Scoring

FIG. 7 provides an example of an evaluation of survey relevance by completing the function necessary for generating a relevance score for each survey which identifies the relative utility of each survey.

First, Entities explicitly provide an initial Survey Relevance Score (SRS) from a range of values relatively which is rescaled to be relatively equivalent to the same values which are provided by the utility function. Second, the Entity is assigned a weight by the system which identifies the degree of importance their evaluation is to a particular survey relative to all other Entities. This is called its opinion weight. This weight is assigned by the system based on a variety of factors specific to each implementation of the system.

In the case of an employment decision, the weight of an Entity might be based how many employment decisions were successfully conducted over the period of the previous two years. In the case of an industrial equipment decision the weight might be based on the average contract size of the organization associated with the Entity for some period of time, or alternatively the size of average annual economic transaction volume which is undertaken by a firm. In the case of a real estate decision, the weight might be based on the number of total acres which a firm might possess. The weights for other types of Entities are assigned by the system according to relevant standards.

Third, the SRS and the derived utility of each survey is given by relevant Entities for a given role in a given decision which is combined to create a survey utility score (SUS). This evaluation is performed as follows:

For the first sum, each Party's derived utility for a particular survey or their SRS is used for a particular survey which is then multiplied by that Party's weight; the product of this operation is then totaled. For the second sum, each Party's derived utility for all surveys or their SRS for all surveys is multiplied by that Party's weight; the product of this operation is totaled. The first sum is divided by the second sum to yield a weighted average of the opinions which Parties have for a given survey in a given role for a given decision.

The Survey Utility Score (SUS) is mathematically expressed as follows:

$$\Lambda(\breve{Q}_{e_s}) := \left( \frac{\sum_{(\substack{n,t \\ e,\breve{e}})=1}^{i,l} \left( U_{\substack{n \\ e}}(\hat{A}_{t}(\breve{Q}_{e_s})) w_{\substack{n \\ e}} \right) \vee \left( SRS_{\substack{n \\ e}}(\hat{A}_{t}(\breve{Q}_{e_s})) w_{\substack{n \\ e}} \right)}{\sum_{(\substack{n,t \\ e,e,s,\breve{e}})=1}^{i,j,k,l} \left( U_{\substack{n \\ e}}(\hat{A}_{t}(Q_{e_s})) w_{\substack{n \\ e}} \right) \vee \left( SRS_{\substack{n \\ e}}(\hat{A}_{t}(Q_{e_s})) w_{\substack{n \\ e}} \right)} \right) w_{\substack{n \\ e}}^{\prime} + \left( \frac{\sum_{(\breve{e})=1}^{l} SRS_{t}(\breve{Q}_{e_s})}{\sum_{(e,s,\breve{e})=1}^{j,k,l} SRS_{t}(Q_{e_s})} \right) w_{\breve{e}}^{\prime} \quad [2.02]$$

Where the utility function of a given Party, $(\substack{n \\ \breve{e}})$, for a given survey, $(Q_{e_s})$, is indicated by $(U_{\breve{e}}^{n}(\hat{A}_{\breve{e}}(Q_{e_s})))$.

The OR operator, (∨), is used to indicate a choice of operations depending on whether the utility function or the SRS provides the best evaluation of a Party's relevance. The SRS for a given Party is $SR_{\breve{e}}^{S_{n}}(\hat{A}_{\breve{e}}(Q_{e_s}))$ and the opinion weight of a Party is indicated by $(w_{\breve{e}}^{n})$. Likewise the SRS of a given Respondent is given $(SR_{\breve{e}}^{S_{i}}(Q_{e_s}))$, and opinion weight of the Counterparty or Counterparties is indicated by $(w_{\breve{e}}^{i})$. In this case the superscripted breve (˘) over the $(Q_{e_s})$ element indicates a separation between the first and second sums which are performed identifying the breved element as the element for target analysis. In general the evaluation can be performed evaluate the discrete sum which all Parties have for a given survey against the value which they have for all surveys for a given role in a given decision.

A brief proof of the increase in computational and storage efficiency is provided here to demonstrate the net-effect of the use of the genetic-optimization process on the total efficiency of decision support systems. If a decision support system lacks a method of identifying which surveys have the greatest weight in a given decision, then Respondents must assume that all surveys either have equal or unknown weight, with the result that they will be required to answer each of them, regardless of what their actual weight is. If this is the case then no matter how many surveys are present in a given decision either each one of them must be answered or they must take the risk that the surveys which remain unanswered might be important and may disqualify them, or the Counterparties they represent, from being selected in a decision.

By example, and not by way of limitation, if no genetic optimization module was provided by the decision support system, and there were 3,000 Respondents and 100 surveys, of which only 10 were highly relevant, then the system would administer more than 300,000 surveys (consuming a considerable number of computational cycles) and it would likewise store at least 300,000 records to a storage medium (consuming considerable storage resources). Subsequent queries made to that storage medium would likewise consume considerable computational cycles as each record would have to be compared to the others in various database procedures.

In contrast, if the genetic optimization is provided, as is provided by System 1000, then a number of needless computer cycles can be avoided. For instance if each Respondent recognizes that only 10 of the surveys out of 100 are highly relevant then they will complete only the minimum number of most relevant surveys. Therefore the decision support system will administer only 30,000 surveys and will collect something near that many records, to be stored on a storage medium, which is a considerable efficiency over the prior result. All of the downstream computer processes will likewise be more efficient by processing fewer records and consuming fewer resources. However, this efficiency is available if the genetic optimization module and the survey relevance module are both applied to the Survey Management Module, FIG. 1.

3: Define Actions & Criteria

With reference again to FIG. 2, at [step 30] each Party defines a series of actions to be performed to other entities meeting a series of threshold conditions, a series of actions which are allowed to be performed to the Party if another entity meets a series of threshold conditions, and a series of threshold conditions which defines each. With reference to FIG. 3A at [step 101] the System 1000 obtains from each entity a series of actions the entity wishes to perform and which may be performed to the entity if a series of threshold conditions are met. These criteria are then stored.

A variety of actions can be performed or be allowed to be performed based on these threshold conditions. Examples of these include but are not limited to entities performing the following actions: sharing information, sending a message, providing an offer, executing a contract, providing a counter-offer, or accepting an offer.

From each Party a series of actions is defined and obtained whereby an Entity identifies a series of actions they would like to perform if a threshold condition is reached. The threshold condition relates to (i) the presence of one or more attribute levels associated with an Entity, (ii) the presence of a given arrangement of attribute levels associated with an Entity, (iii) a utility function evaluation that cumulatively exceeds a given threshold for a given arrangement, or (iv) the mutual utility function evaluation cumulatively exceeds a threshold value between or amongst Entities for a given arrangement.

In the first case, for example, an Entity might define a certain attribute level which will trigger an action, whereby if one or more of those individual attribute levels are met a series of actions are triggered. For instance, in an employment decision a certain highly sought-after skill may be extremely rare and valuable within an employment market therefore a potential employer might want to communicate immediately with any potential employee that possesses this skill rather than undertaking the more lengthy evaluation procedure.

In the second case, for example, an Entity might define a certain combination of attribute levels which might trigger an action, whereby if a certain series of arrangement of conditions are met (a series of AND conditions) or a certain combination of sets of conditions are met (a series of OR conditions) the action would be employed by the system. For instance, in a real estate decision a Party acting as a potential buyer might want to perform the action of making an offer on any home that falls within a given area which has been identified AND which has a particular square foot requirement OR which is valued by a certified appraiser above a certain threshold.

In the third case, for example, an Entity might define the conditions of an action on the basis of a cumulative utility function evaluation, whereby if any counterpart Entity in a given decision meets or exceeds a certain utility value a certain action is performed. For instance, in the case of a contracting decision a contractor has received the survey responses of all subcontractors and has previously narrowed the pool of possible candidates for this particular decision through a bidding and offer process. The contractor therefore wants to define, amongst a matrix of competing utility criteria a certain threshold that must be exceeded. Once this utility value is exceeded the offer will immediately be accepted. In such a case the contractor's aggregate utility function evaluation of the various subcontractor's attribute levels is used as the threshold criteria for performing an action.

In the forth case, for example, an Entity might define the conditions of an action on the basis of a cumulative mutual function evaluation which must exist between or amongst the various arrangement of Entities in order for an action to occur. For instance, an investment broker might have details of various investments which are confidential but which they would be willing to share if the mutual "fit" between the investment, the investment broker, and the investor were above a certain threshold. In such a case the investor would allow the confidential information to be shared if the mutual evaluation between/amongst all entities were above a given threshold.

4: Collect Survey Responses

With reference to FIG. 2 [step 40] and FIG. 3A [step 102], Counterparties and Co-Respondents provide responses to the surveys selected by Parties. In general any completed response of a Respondent, which is indicated by A ($A_d^i(Q_{e_s})$) or ($^{A_{i_{e_n}}}$) in an abbreviated form, can have a variety of attribute levels which characterize it. In the figure each column represents a Responder. It should be noted that an array of these attributes is also represented as the array $\{^{A_{i_{e_n}}}\}$.

In the example of an employment decision a series of attributes levels and attributes which might represent a potential employer might be as follows:

TABLE 1

| ATTRIBUTES | ATTRIBUTE LEVELS |
|---|---|
| Salary | 0, . . . , 30000, 31000, 32000, 33000, |
| Medical Benefits | none, partial low, partial med, partial high, full, full plus |
| Work Environment | formal, professional, business casual, casual, very casual |
| Typical Career Advancement | none, 1 year, 2 years, 3 years, . . . , 10+ years |
| Colleague/Co-Worker Interaction | none, very low, low, med, high, very high, continual |
| Average Previous Employee Rating | 0, 1, 2, 3, 4, 5, 6, 7, 8, 9 |
| Work-Work-Life Balance | 0, 1, 2, 3, 4, 5, 6, 7, 8, 9 |
| Industry Ranking | 0, 1, 2, 3, 4, 5, 6, 7, 8, 9 |
| Year Over Year Revenue Growth | −1000%, . . . , 1000+% |
| Average Employee Turnover | 0, 1, 2, 3, 4, 5, 6, 7, 8, 9 |
| Average Previous Employee Rating | 0, 1, 2, 3, 4, 5, 6, 7, 8, 9 |
| Employee Communication History | 0%, . . . , 100% |
| HR Issue Responsiveness History | 0%, . . . , 100% |
| Organizational Rating | 0, 1, 2, 3, 4, 5, 6, 7, 8, 9 |
| Department Staff Size | 0, . . . , 10, 11, 12, . . . , ∞ |
| Number Of Supervisors | 0, . . . , 10, 11, 12, . . . , ∞ |
| Number Of Subordinates | 0, . . . , 10, 11, 12, . . . , ∞ |
| Employee Rating Of Career Training | |
| Program | 0, . . . , 10, 11, 12, . . . , ∞ |
| Employee Rating Of Clarity Of | |
| Expectations | 0, . . . , 10, 11, 12, . . . , ∞ |
| Employee Rating Of Congeniality | 0, . . . , 10, 11, 12, . . . , ∞ |
| Organizational Reporting Structure | heavyweight team, lightweight team, matrix, functional |
| Current Annual Business Volume | 0, . . . , 50000, 75000, 100000, 125000, . . . , ∞ |
| % Time Spent In Traveling | 0%, . . . , 100% |
| Institution Credit Score | 0, . . . , 100 |

TABLE 1-continued

| ATTRIBUTES | ATTRIBUTE LEVELS |
|---|---|
| Audit Opinion History | unqualified, qualified, disclaimer, adverse |
| Lowest 6 Month Credit Balance | 0, . . . , 500000, 750000, 1000000, 1250000, . . . , ∞ |
| Highest 6 Month Credit Balance | 0, . . . , 500000, 750000, 1000000, 1250000, . . . , ∞ |
| Businesses Scoring Worse | 0%, . . . , 100% |
| Bankruptcies | 0, . . . , 10+ |
| Judgments Filed | 0, . . . , 50+ |
| Collections | 0, . . . , 50+ |

For the same employment decision a brief sample of the attributes and attribute levels which might represent a potential employee might be as follows:

TABLE 2

| ATTRIBUTES | ATTRIBUTE LEVELS |
|---|---|
| Highest Education Level | basic, secondary, associates, bachelors, masters, PhD, multi PhD |
| Number Of Industry Connections | 0, . . . , 70, 75, 80, 85, 90, . . . , 1000+ |
| Honesty | 0, 1, 2, 3, 4, 5, 6, 7, 8, 9 |
| Conscientiousness | 0, 1, 2, 3, 4, 5, 6, 7, 8, 9 |
| General Ability | 50, . . . , 100, 105, 110, . . . , 200 |
| Adaptability | 0, 1, 2, 3, 4, 5, 6, 7, 8, 9 |
| Social Ability | 0, 1, 2, 3, 4, 5, 6, 7, 8, 9 |
| Employees Managed | 0, . . . , 5, 6, 7, . . . , 100+ |
| Budgets Managed | 0, 25000, 50000, 75000, . . . , 10000000+ |
| Requested Skill Experience 1 | 0, 1, 2, 3, 4, 5, 6, 7, 8, 9 |
| Requested Skill Experience 2 | 0, 1, 2, 3, 4, 5, 6, 7, 8, 9 |
| Requested Skill Experience 3 | 0, 1, 2, 3, 4, 5, 6, 7, 8, 9 |
| Requested Skill Experience 4 | 0, 1, 2, 3, 4, 5, 6, 7, 8, 9 |
| Requested Skill Experience 5 | 0, 1, 2, 3, 4, 5, 6, 7, 8, 9 |
| Requested Skill Experience (n) | 0, 1, 2, 3, 4, 5, 6, 7, 8, 9 |
| Availability | available, unavailable |

In the example of a service decision a brief sample of the attributes and attribute levels which might represent a service provider might be as follows:

TABLE 3

| ATTRIBUTES | ATTRIBUTE LEVELS |
|---|---|
| Clear Communication History | 0%, . . . , 100% |
| Client Responsiveness History | 0%, . . . , 100% |
| Safety Audit History | low risk:, 0%, . . . , 100%, |
| | med risk:, 0%, . . . , 100% |
| | high risk:, 0%, . . . , 100% |
| Payment Terms | cash, 0%, . . . , 100% net 10, 0%, . . . , 100% . . . net 360 |
| Included Service Level Per Year | maintenance visits:, 0, 1, 2, 3, . . . , 40 |
| | training visits: 0, 1, 2, 3, . . . , 40 |
| | emergency visits: 0, 1, 2, 3, . . . , 40 |
| | on-on-call training: 0, 1, 2, 3, . . . , 40 |
| On-Time Delivery History | 0%, . . . , 100% |
| Coordination With Other Vendor History | 0%, . . . , 100% |
| Staffing Sufficiency Opinion | 0, 1, 2, 3, 4, 5, 6, 7, 8, 9 |
| Quality Work Product Opinion | 0, 1, 2, 3, 4, 5, 6, 7, 8, 9 |
| Legal Compliance Opinion | 0, 1, 2, 3, 4, 5, 6, 7, 8, 9 |
| Professional Service Rating | 0, 1, 2, 3, 4, 5, 6, 7, 8, 9 |
| Current Staff Size | 0, . . . , 10, 11, 12, . . . , ∞ |
| Current Annual Business Volume | 0, . . . , 50000, 75000, 100000, 125000, . . . , ∞ |
| Current Annual Business Volume Capacity | 0, . . . , 50000, 75000, 100000, 125000, . . . , ∞ |
| Current Excess Capacity | 0, . . . , 50000, 75000, 100000, 125000, . . . , ∞ |
| General Liability Insurance Coverage | 0, . . . , 500000, 750000, 1000000, . . . , 100000000 |
| (Technicalexpertise1) | 0, 1, 2, 3, 4, 5, 6, 7, 8, 9 |
| (Technicalexpertise2) | 0, 1, 2, 3, 4, 5, 6, 7, 8, 9 |
| (Technical Expertise(n)) | 0, 1, 2, 3, 4, 5, 6, 7, 8, 9 |

In the same example of a service decision a brief sample of the attributes and attribute levels which might represent an institution might be as follows:

TABLE 4

| ATTRIBUTES | ATTRIBUTE LEVELS |
|---|---|
| Clear Communication History | 0%, ..., 100% |
| Institution Credit Score | 0, ..., 100 |
| Audit Opinion History | unqualified, qualified, disclaimer, adverse |
| Lowest 6 Month Credit Balance | 0, ..., 500000, 750000, 1000000, 1250000, ..., ∞ |
| Highest 6 Month Credit Balance | 0, ..., 500000, 750000, 1000000, 1250000, ..., ∞ |
| Businesses Scoring Worse | 0%, ..., 100% |
| Bankruptcies | 0, ..., 10+ |
| Judgments Filed | 0, ..., 50+ |
| Collections | 0, ..., 50+ |
| Annual Revenues | 0, ..., 1000000, 1100000, 1200000, ..., ∞ |
| Payment Schedule | cash, 15, 30, 45, 60, 90, 120,180, 360 |
| Available Work | 0, ..., 50000, 75000, 100000, 125000, ..., ∞ |
| Work Growth Rate | 0%, ..., 100%, ..., ∞ |
| (Work Requirement 1) | (description1), (description2), (description3), ..., (description(m)) |
| (Work Requirement 2) | (description1), (description2), (description3), ..., (description(m)) |
| (Work Requirement 3) | (description1), (description2), (description3), ..., (description(m)) |
| (Work Requirement (n)) | (description1), (description2), (description3), ..., (description(m)) |

In the example of a real estate decision a brief sample of the attributes and attribute levels which might represent an owner/lessor might be as follows:

TABLE 5

| ATTRIBUTES | ATTRIBUTE LEVELS |
|---|---|
| Price Per Square Foot | 0, ..., 0.25, 0.26, 0.27, ..., 7.0, 7.1, 7.2, ..., ∞ |
| Price Term | day, month, quarter, biannual, annual |
| Parking Spaces | 0, ..., 5, 6, 7, 8, ..., 50, 51, 52, ..., 1000+ |
| Contract Type | fee simple, percentage lease, net lease, double net lease, triple net lease, gross lease |
| Space Type | office, flex, mixed-use, retail, heavy industrial, light industrial, residential |
| Utilities Included | heating: 0%, ..., 100% |
| | water & sewer: 0%, ..., 100% |
| | electricity: 0%, ..., 100% |
| | telephone: 0%, ..., 100% |
| | internet: 0%, ..., 100% |
| Common Area Maintenance Included | security: 0%, ..., 100% |
| | advertising: 0%, ..., 100% |
| | parking: 0%, ..., 100% |
| | repairs and renovations: 0%, ..., 100% |
| | taxes & permits: 0%, ..., 100% |
| Lease Length In Months | n/a, 0, 25, 0, 5, 1, 3, 6, 9, ..., 120+ |

In the same example of a real estate decision a brief sample of the attributes and attribute levels which might represent a buyer/lessee might be as follows:

TABLE 6

| ATTRIBUTES | ATTRIBUTE LEVELS |
|---|---|
| Credit Available | 0, ..., 5000000, 600000, 7000000, 8000000, ..., ∞ |
| Lease History | 0, 1, 2, 3, 4, 5, 6, 7, 8, 9 |
| Payment History | 0, 1, 2, 3, 4, 5, 6, 7, 8, 9 |
| Credit Score | 0, ..., 100 |
| Lowest 6 Month Credit Balance | 0, ..., 500000, 750000, 1000000, 1250000, ..., ∞ |
| Highest 6 Month Credit Balance | 0, ..., 500000, 750000, 1000000, 1250000, ..., ∞ |
| % Scoring Worse | 0%, ..., 100% |
| Bankruptcies | 0, ..., 10+ |
| Judgments Filed | 0, ..., 50+ |
| Collections | 0, ..., 50+ |
| Annual Revenues | 0, ..., 100000, 110000, 120000, ..., ∞ |
| Free Cash Flow | 0, ..., 10000, 11000, 12000, ..., ∞ |

In the example of an industrial equipment decision a brief sample of the attributes and attribute levels which might represent an industrial equipment provider might be as follows:

TABLE 7

| ATTRIBUTES | ATTRIBUTE LEVELS |
|---|---|
| Price Per | 0, ..., 500000, 750000, 1000000, 1250000, ..., ∞ |
| Price Term | purchase, hour, day, month, quarter, half-year, year, 2-years |
| Working Hours On Machine | 0, ..., 6000, 7000, 8000, ..., ∞ |
| Major Maintenance Narrative | (event1:hours), (event2:hours), (event3:hours), ..., (event(m):hours), |
| Peak Daily Output | 0, ..., 1000, 1100, 1200, ..., ∞ |
| Average Daily Output | 0, ..., 800, 900, 1000, ..., ∞, |
| Daily Operational Time In Hours | 0, ..., 8, 9, 10, 12, 13, ..., 24 |
| Daily Operational Maintenance | 0, ..., 0, 25, 0, 5, 0, 75, 1, 0, ..., 24 |
| Daily Operators Needed | 0, ..., 1, 2, 3, 4, 5, ..., ∞ |
| Input interface | direct manipulation, graphical, web, touchscreen, command line, file input |

TABLE 7-continued

| ATTRIBUTES | ATTRIBUTE LEVELS |
|---|---|
| Physical Dimensions | length: 1, . . . , 100 |
| | width: 1, . . . , 100 |
| | depth: 1, . . . , 100 |
| Power Inputs | volts: 1, . . . , 100 |
| | amps: 1, . . . , 100 |
| (Equipment Specification 1) | (description1), (description2), (description3), . . . , (description(m)), |
| (Equipment Specification 2) | (description1), (description2), (description3), . . . , (description(m)), |
| (Equipment Specification 3) | (description1), (description2), (description3), . . . , (description(m)), |
| (Equipment Specification (n)) | (description1), (description2), (description3), . . . , (description(m)), |
| Included Service Level Per Year | regular maintenance visits: 0, 1, 2, 3, . . . , 40 |
| | emergency maintenance visits: 0, 1, 2, 3, . . . , 40 |
| | training visits: 0, 1, 2, 3, . . . , 40 |
| | on-call-training: 0, 1, 2, 3, . . . , 40 |
| Included Maintenance | none, parts, labor, visits |
| Shipment Options | FOB, C&F, OF, BW |
| Installation Options | none, included, required, partial, delivery |

In the same example of an industrial equipment decision a brief sample of the attributes and attribute levels which might represent an industrial equipment user might be as follows:

TABLE 8

| ATTRIBUTES | ATTRIBUTE LEVELS |
|---|---|
| Institution Credit Score | 0, . . . , 1000 |
| Audit Opinion History | unqualified, qualified, disclaimer, adverse |
| Lowest 6 Month Credit Balance | 0, . . . , 500000, 750000, 1000000, 1250000, . . . , ∞ |
| Highest 6 Month Credit Balance | 0, . . . , 500000, 750000, 1000000, 1250000, . . . , ∞ |
| Businesses Scoring Worse | 0%, . . . , 100% |
| Bankruptcies | 0, . . . , 10+ |
| Judgments Filed | 0, . . . , 50+ |
| Collections | 0, . . . , 50+ |
| Contract Length In Months | 0, . . . , 8, 9, 10, 12, 13, . . . , 120 |
| Dimensions Of Available Space | length:, 1, . . . , 100 |
| | width:, 1, . . . , 100 |
| | depth:, 1, . . . , 100 |
| Payment Schedule In Days | cash, 15, 30, 45, 60, 90, 120, 180, 360 |
| Min Unit Volume | 0, . . . , 360000, 396000, 432000, |
| Max Unit Volume | 0, . . . , 360000, 396000, 432000, . . . , ∞ |
| (Equipment Specification 1) | (description1), (description2), (description3), . . . , (description(m)) |
| (Equipment Specification 2) | (description1), (description2), (description3), . . . , (description(m)) |
| (Equipment Specification 3) | (description1), (description2), (description3), . . . , (description(m)) |
| (Equipment Specification(n)) | (description1), (description2), (description3), . . . , (description(m)) |

In the example of a financial investment decision a brief sample of the attributes and attribute levels which might represent a financial services provider might be as follows:

TABLE 9

| ATTRIBUTES | ATTRIBUTE LEVELS |
|---|---|
| Management Certification | CFA, CMA, CGFM, CFRM |
| Professional Investment Opinion | 0, 1, 2, 3, 4, 5, 6, 7, 8, 9 |
| Historical Return Beta | −3, . . . −2, . . . −1, . . . 0, . . . 1, . . . 2, . . . 3 |
| Historical Return Statistical Location | |
| Parameter | −10, 0, −9, 9, −9, 8, . . . , 0, . . . , 8, 9, 9, 10 |
| Historical Return Statistical Dispersion | |
| Parameter | 0, 10, 20, 30, . . . , ∞ |
| Historical Return Skew Parameter | −10, 0, −9, 9, −9, 8, . . . , 0, . . . , 8, 9, 9, 10 |
| Historical Return Kurtosis Parameter | −10, 0, −9, 9, −9, 8, . . . , 0, . . . , 8, 9, 9, 10 |
| Exchange Listing | n/a, private, NASDAQ, NYSE, CME, ISE, NYMEX, DAX, TSE, LSE, HKSE, TSE, SIX, MICEX, JSE, NSEI, BSE, BME, SSE, ASE, BMF |
| Investment Capitalization | 0, . . . , 500000, 750000, 1000000, 1250000, . . . , ∞ |
| Number Of Investors | 1, 10, 20, 30, . . . , ∞ |
| Number Of Shares | 1, 10, 20, 30, . . . , ∞ |
| Average Investor Statistics | (description1), (description2), (description3), . . . , (description(m)) |

TABLE 9-continued

| ATTRIBUTES | ATTRIBUTE LEVELS |
|---|---|
| Investment Duration Days | 1, 7, 14, 21, 30, 60, 90, 120, 180, . . . , 2700, 3200, 3650 |
| Industrial Sector | energy, materials, industrials, consumer discretionary, consumer staples, healthcare, financials, info-tech, telecom, utilities |
| Quick Ratio | 5, 1, 0, 1, 5, 2, 0, . . . , 500+ |
| Current Ratio | 5, 1, 0, 1, 5, 2, 0, . . . , 500+ |
| Cash Ratio | 5, 1, 0, 1, 5, 2, 0, . . . , 500+ |
| Total Operating Profit Margin | 0%, . . . , 100%, . . . , 10000% |
| Total Return On Assets | 0%, . . . , 100%, . . . , 10000% |
| Total Return On Equity | 0%, . . . , 100%, . . . , 10000% |
| Growth Rate | 0%, . . . , 100%, . . . , 10000% |
| Turnover Ratio | 0%, . . . , 100%, . . . , 10000% |
| Investment Expenses | 0%, . . . , 100%, . . . , 10000% |
| Minimum Investment Amount | 0, . . . , 5000, 7500, 10000, 15000, . . . , ∞ |

In the same example of an financial investment decision a brief sample of the attributes and attribute levels which might represent an investor might be as follows:

TABLE 10

| ATTRIBUTES | ATTRIBUTE LEVELS |
|---|---|
| Annual Salary Income | 0, . . . , 100000, 110000, 120000, . . . , ∞ |
| Annual Investment Income | 0, . . . , 100000, 110000, 120000, . . . , |
| Income Stability | very unstable, unstable, moderately stable, stable, very stable |
| Cash Equivalent Holdings | 0, . . . , 100000, 110000, 120000, . . . , ∞ |
| Net Real Estate Holdings | 0, . . . , 100000, 110000, 120000, . . . , ∞ |
| Stock Holdings | 0, . . . , 100000, 110000, 120000, . . . , ∞ |
| Bond Holdings | 0, . . . , 100000, 110000, 120000, . . . , ∞ |
| Investment Experience | angel funding: 0, . . . , 9<br>private venture: 0, . . . , 9<br>small-cap stocks: 0, . . . , 9<br>mid-cap stocks: 0 . . . , 9<br>large-cap stocks: 0, . . . , 9<br>foreign stocks: 0, . . . , 9<br>mutual funds: 0, . . . , 9<br>hedge funds: 0, . . . , 9<br>private bonds: 0, . . . , 9<br>corporate bonds: 0, . . . , 9<br>government bonds: 0, . . . , 9<br>foreign bonds: 0, . . . , 9<br>options: 0, . . . , 9<br>commodities: 0, . . . , 9<br>foreign exchange: 0, . . . , 9 |
| Loss Aversion | 0, 1, 2, 3, 4, 5, 6, 7, 8, 9 |
| Liquidity Preference | 0, 1, 2, 3, 4, 5, 6, 7, 8, 9 |
| Suggestibility | 0, 1, 2, 3, 4, 5, 6, 7, 8, 9 |
| Investment Time Horizons(Months) | angel funding: 0, . . . , 120<br>private venture: 0, . . . , 120<br>small-cap stocks: 0, . . . , 120<br>mid-cap stocks: 0, . . . , 120<br>large-cap stocks: 0, . . . , 120<br>foreign stocks: 0, . . . , 120<br>mutual funds: 0, . . . , 120<br>hedge funds: 0, . . . , 120<br>private bonds: 0, . . . , 120<br>corporate bonds: 0, . . . , 120<br>government bonds: 0, . . . , 120<br>foreign bonds: 0, . . . , 120<br>options: 0, . . . , 120<br>commodities: 0, . . . , 120<br>foreign exchange: 0, . . . , 120 |
| Investor Risk Profile | conservative, moderately conservative, moderate, moderately aggressive, aggressive |

The variable ($\hat{A}$) identifies that the variable is a response of a Counterparty or Co-Respondent, the subscript ($\hat{e}$) identifies the value of the Counterparty and Co-Respondent, the sub-subscript (m) identifies the value of the entity which generated the survey and (n) identifies the survey which among a number of surveys was generated by the entity.

The process of each Counterparty responding to each survey is also mathematically represented as:

$$\hat{A}_{f}(Q_{e_s}) := \overset{i,j}{\underset{(e,s)=1}{\hat{A}}} (Q_{e_s}) \qquad [4.01]$$

Figure 9:
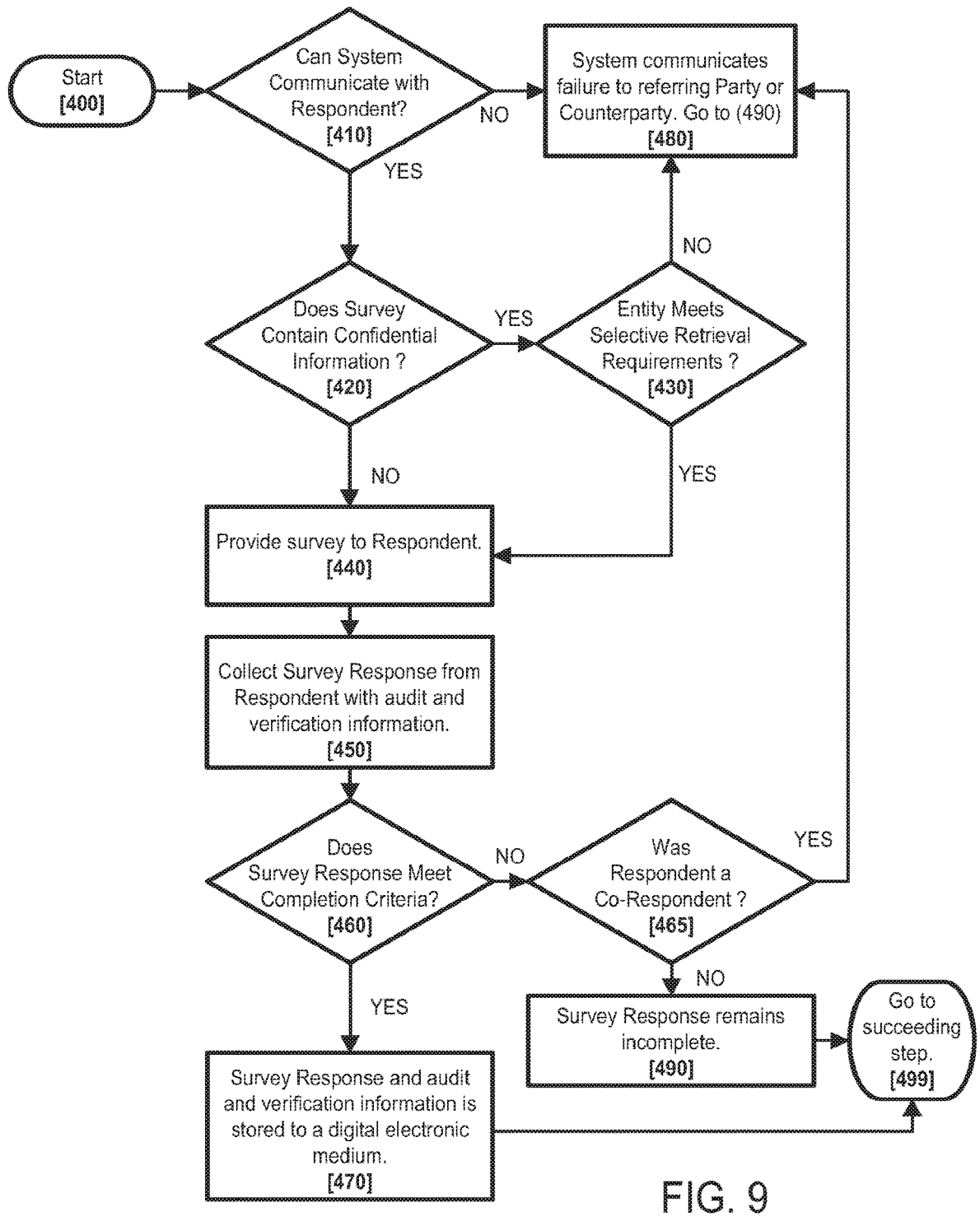
FIG. 9 is a flowchart illustrating the process for gathering survey responses from Respondents according to a preferred embodiment of the invention.

The System 1000 communicates with Respondents in order for Respondents to complete Survey Responses. FIG. 9 outlines the procedure whereby the System 1000 communicates with respondents in order to collect Survey Responses.

The System 1000 attempts to communicate with the Respondent using information provided by either Counterparty from FIG. 5 or Party from FIG. 5. The System 1000 then identifies whether it can communicate with the Respondent ([step 410]). This communication can be performed in several ways. In the most preferred embodiment this communication occurs through an electronic communication network whereby an electronic message is sent to the Respondent and the Respondent provides the Survey Response through the same electronic communication medium. Alternatively the contact can be made and the survey conducted between two people over a telephone communication network. It can also be performed through a letter which requests an individual complete a paper survey and sends the survey to processing facility which processes the information and returns the results via a communication network. The survey can also be completed by a personal interview whereby the Respondent is interviewed by an interviewer and the interviewer provides the information to the system over a communication network. If the Respondent cannot be reached then the survey remains incomplete and the referring entity is informed that the Survey is incomplete [step 480].

Parties are able to identify confidential information that is selectively retrievable only to entities which meet a certain threshold criteria. At [step 420] the system identifies whether the survey information is confidential. At [step 430] the system identifies whether survey respondents meet the criteria necessary to receive the confidential materials. At [step 440] Counterparties are presented with all surveys that have been selected by all relevant Parties for a given decision category or subcategory.

In many situations where a mutual decision is made between more than one counterpart Parties all users have to duplicate the work of completing each other's surveys. This includes answering multiple surveys multiple times, resulting in enormous duplication, in spite of the fact that the information requested from many of these surveys and produced in response to these many surveys is largely the same duplicated information. Additionally, this duplication results in the use of considerable system resources needed to process each of these tasks, for example each survey that is administered requires both computational cycles to administer. Similarly, each response which is gathered from a survey administration creates a record which requires storage space. Together these both greatly affect all of the downstream dependent system processes which require resources which are dependent on identifying and evaluating response information which has been stored. For instance there is the example of contracting decision, where subcontractors and contractors participate in a decision where each counterpart Party evaluates and selects its counterpart Counterparties, although the same problem can apply to any multilateral decision.

In the present state of the art, each individual contractor involved in a decision provides a request for a proposal (RFP), a request for bid (RFB), a request for tender (RFT), or a request for information (RFI) from relevant subcontractors which contains a number of surveys. Each Counterparty subcontractor receives the RFPs, RFBs, RFTs, or RFIs and prepares a series of responses which is then sent to each Party contractor.

In aggregate the number of responses which must be prepared by each subcontractor is roughly equivalent to the sum of the number of surveys which each contractor individually provides to each subcontractor. Consequently for each subcontractor the number of contractor surveys which must be completed is as follows:

$$\sum_{(e,s)=1}^{i,j} Q_{e_s} : \{x=1 \qquad [4.02]$$

Where ($Q_{e_s}$) are the number of total surveys that each subcontractor must complete and (x)=1 represents whether a request for a particular survey is true and (x)=0 represents whether a request for a particular survey is false (see [Table 11] for visualization). Most of these surveys are duplicates and the responses will be duplicates as well. Because each subcontractor has to complete each RFPs, RFBs, RFTs, or RFIs to be considered in the decision, all the subcontractors collectively complete:

$$\left(\sum_{(e,s)=1}^{i,j} Q_{e_s} : \{x=1\right) k \qquad [4.03]$$

Where (k) is the number of subcontractors in this case. Consider that each contractor must also likewise meet the decision criteria of each counterpart subcontractor through either a formal or informal surveying process. The number of surveys which must be responded to grows combinatorially to the following evaluation:

$$\left(\sum_{(e,s)=1}^{i,j} Q_{e_s} : \{x=1\right) k + \left(\sum_{(e,s)=1}^{g,h} Q_{e_s} : \{x=1\right) l \qquad [4.04]$$

Where (l) represents the number of contractors. It is then no wonder then why most decisions generally only involve a small set or subset of counterpart Entities engaged in a mutual decision. For if each of these responses represented even a small quantity of finite time and effort which must be performed then a large combinatorial set would quickly overwhelm any Party or Counterparty with a sufficiently large number. If we were to consider multiple sets of role relations where a decision has more than one counterpart role the situation becomes even more overwhelming. This same situation likewise applies with relation to the system resources which must be utilized to efficiently process decision information. A large set of Parties or Counterparties quickly sums to a larger number of system processes and records than can be reasonably administered or recorded by a system.

Consider the simple case where the number of subcontractors involved in a decision is 50 and the number of contractors involved in a decision is 20 and number of surveys which subcontractors must respond to is on average 30 and the number of surveys which contractors must respond is on average 15. In this case the number of subcontractor responses would have to be equal to or greater than (50*20*30=30,000) and the number of contractor responses would have to be equal to or greater than (20*50*15=15,000) totaling equal to or greater than 45,000 responses. The sheer number volume of responses limits the capacity of any one individual, or group of individuals, from reasonably evaluating more than a few potential Party/Counterparty combinations if there is even a negligible resource cost for each response.

Accordingly, System 1000 provides a means to minimize the number of mutual surveys which each party requests the other complete by aggregating all of the relevant surveys which apply to each decision and each role and presenting to each Respondent only the union set of unique surveys which are to be completed by the Respondent. The Respondent provides a survey response to each survey and the response provided is utilized in all cases where the Party requested a survey response from each Entity.

This procedure reduces the number of surveys which have to be completed by one whole factor in each case. It furthermore reduces the number of system survey administrations and records by the same number. In the above example this would indicate that the total number of surveys which each subcontractor entity would have to complete (and which would be administered and recorded by the system) would be approximately only 30 surveys-totaling only 600 for all subcontractors, and each contracting entity would have to complete approximately only 15 surveys-totaling 750 for all contractors.

[Table 11] shows this concept by reducing the number of survey responses which each Party requests each Counterparty to complete. The concept is illustrated visually, where the reduction by the union set of surveys reduces the total number of surveys which the Respondent has to complete (and which the system has to administer and record) from 95 to 7-(the total number of surveys as represented by the columns) resulting in significant labor savings. Within the table [Table 11] the identified one (1) values represent instances where entity (en) has requested a response to survey (s), in contrast the zero (0) values represent instances where the survey is not requested to be completed by a Party. The one (1) and zero (0) values correspond to the (x) value in formulae [4.02, 4.03, 4.04].

TABLE 11

Survey Responses Required

|  | $S_1$ | $S_2$ | $S_3$ | $S_4$ | $S_5$ | $S_6$ | $S_7$ |
|---|---|---|---|---|---|---|---|
| $e_1$ | 1 | 0 | 0 | 0 | 0 | 0 | 1 |
| $e_2$ | 1 | 0 | 0 | 1 | 1 | 0 | 0 |
| $e_3$ | 0 | 0 | 1 | 0 | 1 | 0 | 0 |
| $e_4$ | 0 | 1 | 0 | 0 | 0 | 1 | 1 |
| $e_5$ | 1 | 1 | 1 | 1 | 0 | 1 | 1 |
| $e_6$ | 0 | 1 | 1 | 0 | 0 | 1 | 1 |
| $e_7$ | 0 | 0 | 0 | 0 | 0 | 1 | 1 |
| $e_8$ | 1 | 0 | 1 | 1 | 0 | 1 | 1 |
| $e_9$ | 0 | 1 | 1 | 0 | 1 | 0 | 0 |
| $e_{10}$ | 0 | 0 | 0 | 0 | 1 | 0 | 1 |
| $e_{11}$ | 0 | 1 | 1 | 0 | 0 | 1 | 0 |
| $e_{12}$ | 1 | 1 | 1 | 1 | 0 | 1 | 0 |
| $e_{13}$ | 1 | 1 | 0 | 0 | 1 | 1 | 1 |
| $e_{14}$ | 1 | 1 | 1 | 1 | 1 | 0 | 0 |
| $e_{15}$ | 1 | 0 | 1 | 0 | 0 | 1 | 1 |
| $e_{16}$ | 1 | 1 | 1 | 1 | 0 | 1 | 0 |
| $e_{17}$ | 1 | 1 | 0 | 1 | 1 | 0 | 1 |
| $e_{18}$ | 0 | 0 | 0 | 1 | 0 | 1 | 1 |
| $e_{19}$ | 1 | 0 | 0 | 1 | 1 | 0 | 1 |
| $e_{20}$ | 1 | 1 | 0 | 1 | 1 | 1 | 0 |
| $e_{21}$ | 0 | 1 | 1 | 1 | 0 | 0 | 0 |
| $e_{22}$ | 0 | 0 | 1 | 0 | 1 | 0 | 1 |
| $e_{23}$ | 1 | 1 | 1 | 1 | 0 | 0 | 1 |
| $e_{24}$ | 1 | 0 | 1 | 1 | 0 | 1 | 0 |
| $e_{25}$ | 0 | 1 | 1 | 0 | 1 | 1 | 0 | total = 95 individual surveys $$\bigcup_{e=1}^{i} Q_{e_s} = 7 \text{ surveys}$$

This is done so for the purpose of minimizing the total time which is required for Counterparties to complete surveys (as well as for the system resources which are required to administer surveys and record responses to a medium)—since in many cases Parties request the same information from Counterparties-which means that a single response to one Party survey may also meet the criteria of many other Party surveys. Counterparties then select the surveys they will complete or have Co-Respondents complete either in conjunction with or on their behalf.

The purpose of the surveying design is to encourage a relevant standard set of surveys to be utilized in each category of information query that each Party will collect from the corresponding entity without the need for an explicitly designed array of surveys. Such an array of surveys requires an administrator of the system to define and design the specific survey arrangement that meets the criteria of all parties simultaneously. In contrast, the system and methodology of the present invention therefore employ an asymmetrical survey design for three reasons: (i) because asymmetrical surveys better reflect most real life situations where Parties interests do not simultaneously reflect those counterpart Parties, (ii) because the ability to not have an administrator allows Parties to develop new categories of decisions and criteria which an administrator might not be able to conceive and (iii) the system design allows for cross-categorical survey comparisons allowing for the greatest possible arrangement of options for each counterpart in a decision. Such an increase in cross-categorical comparisons allows for a greater multiplicity of decision arrangements which increases aggregate utility for all decision counterparts.

It should be noted surveys may be presented to Counterparties and Co-Respondents in a hierarchical fashion in order to improve the context of the data provided to the system. As such a taxonomical tree of categories is provided. Each branch of the taxonomical tree is a category. An example of a hierarchical taxonomy or tree is presented in FIG. 8. This figure illustrates that a survey taxonomy may be presented in an (n) number of subordinate branches.

Surveys can take a broad array of forms. Surveys may be graphical, auditory, written, audio-visual, numerical, programmatic, or any variety of media which can be processed through a computer. Respondents select which ones to complete as identified in FIG. 6 steps [305], [310] and [315].

In a preferred embodiment, functionality is included whereby Co-Responders provide additional information, or co-responses, related to a Counterparty Entity. These co-responses may take one of several forms: (i) this information may be provided in the form of the verification of one or more Counterparty survey responses to identify whether the response provided by the Counterparty is accurate or not; (ii) the information provided by a Co-Respondent may be in the form of a survey response on behalf of a Counterparty or (iii) a Co-Respondent may provide a separate co-response directly to surveys which are posed from the Party to the Co-Respondent about the Counterparty entity. Such survey responses may be an assessment of the objective or subjective attributes which a Counterparty may or may not possess which are known or perceived by the Co-Respondent. These were previously identified in [step 255] and [step 260] of FIG. 5.

With reference to FIG. 9, at [step 450] Survey Responses are provided by Counterparties and Co-Respondents in quantitative, qualitative, and categorical responses to surveys which can be evaluated by a computing device. (It should be noted that computing devices can process and evaluate numerical, textual, pictographic, binary, programmatic, sequential, digital, and analog signal responses. Each of these formats can serve as an appropriate response for a given Party depending on the precise needs or interests of the Party.)

At [step 460] a test is performed to identify whether the Survey Responses meet the completion criteria which the Party defined in [step 225] of FIG. 6. If the Survey Response does not meet these criteria it is rejected. At [step 465] if the response was rejected then the system determines whether the Respondent was a Co-Respondent or whether it was a Counterparty. At [step 480] if the Entity assigned the Survey Response was a Co-Respondent then a message is sent by the referring Entity to inform them of the failure. As indicated in [step 490] the Survey Response remains incomplete. If the Entity assigned the Survey Response was not a Co-Respondent then [step 490] the Survey Response remains incomplete and the system proceeds to the next step [499].

If the test at [step 460] determined that the Survey Response met the completion criteria then the system proceeds to store the Survey Responses along with the audit and verification information. The type of audit and verification information records a timestamp, the communication network information which identifies the Respondent along with any self-verifying surveys which help to identify the Respondent, and the relationship they have with the Counterparty. Afterwards the system proceeds to the next succeeding step [499].

5: Get Preference Responses

With reference to FIG. 2 [step 50] and FIG. 3A, [step 103], once a sufficient number of responses and co-responses have been provided to the system a Party undertakes the evaluation of the Survey Responses in order encode its information necessary for making a decision. The system presents Evaluators with a series of Survey Responses and Dummy Responses designed to force Party and Co-Evaluators to reveal the utility values they place on the following: (i) attribute levels with respect to other attribute levels within a given attribute, (ii) attributes with respect to other attributes, and (iii) collections of attributes with respect to other collections of attributes which can also extend to evaluating entities with respect to other entities. Through this systematic process each Party ranks the survey responses of Counterparties. The Evaluator may or may not evaluate all Survey Responses. Once a sufficient number of Survey Responses has been evaluated relatively similar responses which have been provided by Respondents can also be evaluated by the system without exposing them directly to the Evaluator. In this way the system provides a means for an Evaluator to evaluate an unlimited number of Entities and Survey Responses by performing a limited number of evaluations. In this way the system magnifies the ability of an Evaluator to evaluate vastly more information than they could possibly evaluate without the facilitation of the system.

The process associated with each Party evaluating each survey response is also mathematically represented in the general case as ($R_e^n$) in where the evaluation proceeds to evaluate attribute levels with respect to other attribute levels within a given attribute attributes with respect to other attributes as mentioned in the above paragraph in (i) and (ii). This evaluation can also apply to evaluating collections of attributes with respect to other collections of attributes.

$$R_e''(\hat{A}_{\hat{e}}'(Q_{e_s})) := \underset{(e,s)=1}{\overset{p,q}{Eval}}\left(\bigcup_{\hat{e}}^{n}(\hat{A}_{\hat{e}}'(Q_{e_s}))\right) \quad [5.01]$$

In an alternative general case represented as ($\tilde{R}_e^n$) evaluation proceeds to evaluate entities with respect to other entities as is indicated in (iii).

$$\tilde{R}_e''(\hat{A}_{\hat{e}}'(Q_{e_s})) := \underset{\hat{e}=1}{\overset{n}{Eval}}\left(\underset{(e,s)=1}{\overset{p,q}{\bigcup}}(\hat{A}_{\hat{e}}'(Q_{e_s}))\right) \quad [5.02]$$

Evaluators provide a series of forced-choice responses to a series of Survey Responses in order to yield their Preference Responses. Evaluators can provide Preference Responses to either discrete sets of Survey Responses along a single attribute dimension or alternatively they can provide Preference Responses multiple attribute dimensions simultaneously. The advantage of providing Preference Responses along multiple attribute dimensions simultaneously is that it allows the system to reduce the total number of comparisons needed in order to generate a Utility Preference Model for the Party or Co-Evaluator.

The specific method of Parties and Co-Evaluators providing Preference Responses to the System 1000 can be performed in a variety of ways; however, in one embodiment of the system, Preference Responses are provided as evaluations of sets and subsets of Survey Responses in order increase the speed of gathering adequate Preference Response data necessary to generate the Utility Preference Model with the additional bi-product that it better maintains the monotonicity of that same model.

Figure 10A:
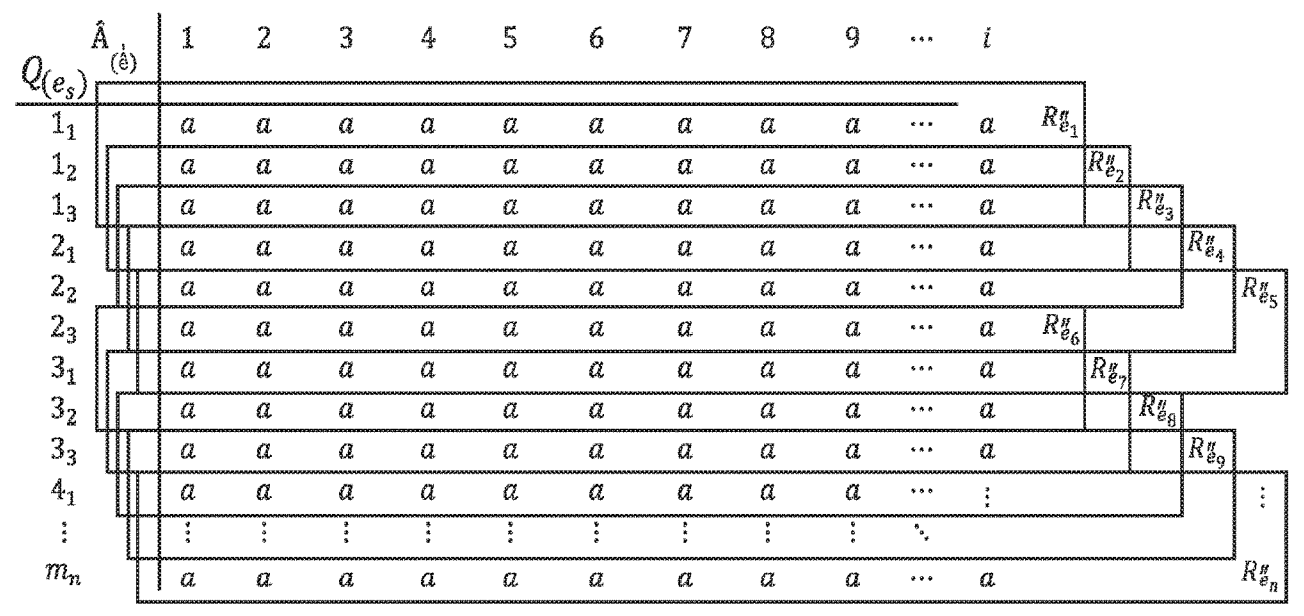

FIG. 10A provides an illustration of this particular method where the rankings or Preference Responses, ($R_{e_n}''$), for each subset of survey responses is provided in a series of steps that evaluates subsets of responses for surveys at a given time. For example, in FIG. 10A the first Preference Response, identified as ($R_{e_1}''$), evaluates the survey responses of Respondents $\{\hat{A}_2, \ldots, \hat{A}_i\}$ for the survey responses $\{Q_{1_1}, \ldots, Q_{2_1}\}$. The second Preference Response, identified as ($R_{e_2}''$), evaluates the survey responses of Respondents $\{\hat{A}_4, \ldots, \hat{A}_i\}$ for the survey responses $\{Q_{2_1}, \ldots, Q_{3_1}\}$. The secondary Preference Response evaluates an overlapping portion of the first Preference Response so that the first and second Preference Responses can be statistically related to one another to ensure monotonicity between certain Preference Responses. As can also be seen in FIG. 10A, subsets of responses evaluated need not include all responses from every responder. Any subset of an adequately diverse array of Survey Responses can provide a suitable arrangement of Survey Responses from which an Evaluator can create a Preference Response.

Figure 10B:
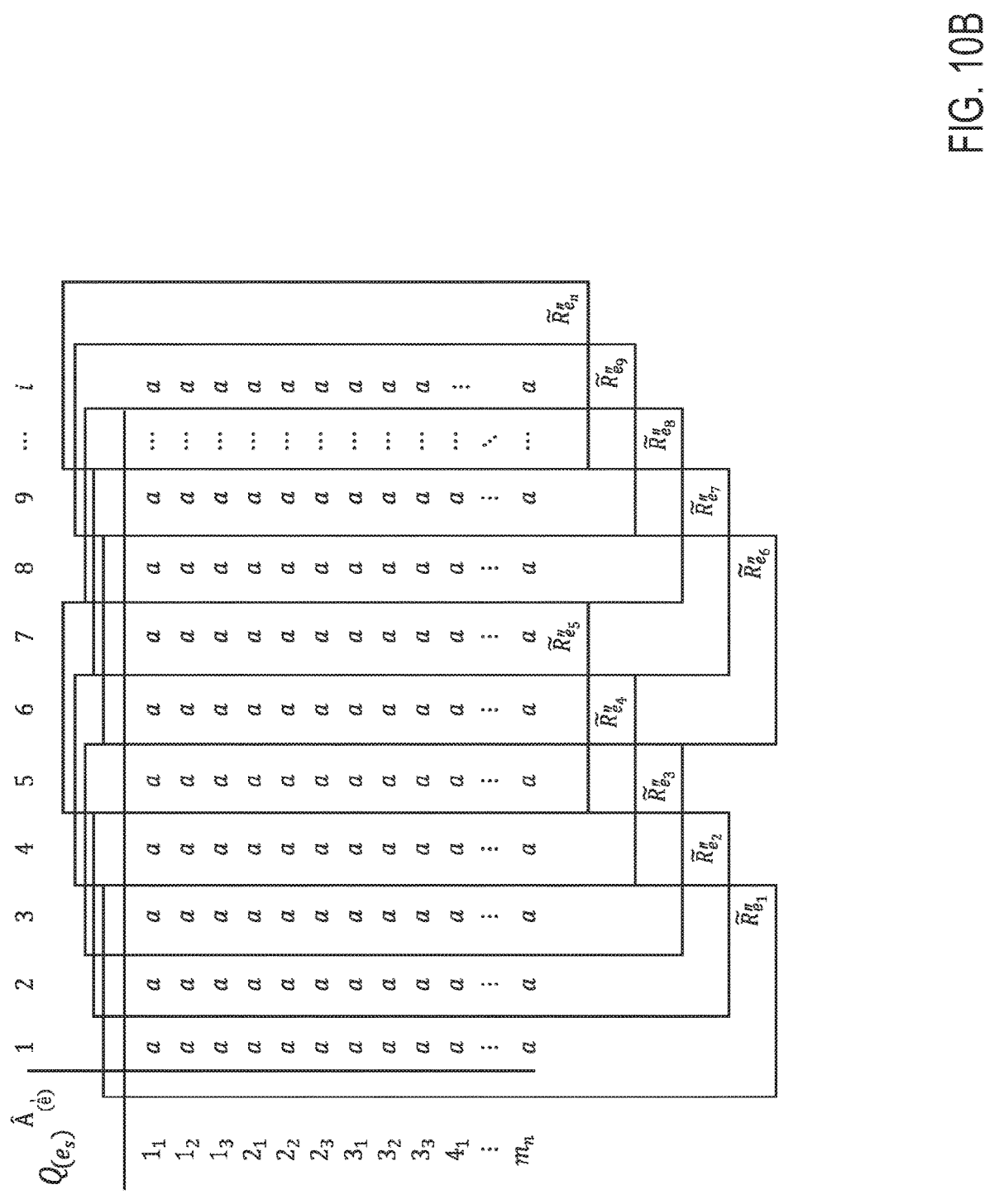

FIG. 10B identifies a similar ranking scheme as FIG. 10A with the distinction being that the domain of evaluation is along the collections of attributes. This distinction is identified as ($\tilde{R}_{e_n}''$). In either case the domain of evaluation can vary along either the ($Q_{e_s}$) or the ($\hat{A}_{\hat{e}}'$) dimension as S $\hat{A}_{\hat{e}}'$ demonstrated in FIG. 10A and FIG. 10B (collectively FIG. 10).

The above can be represented in a functional mathematical design as an extension of the general case indicated as ($R_e''$) and ($\tilde{R}_e''$) as follows for each case.

$$R_e''(\hat{A}_{\hat{e}}'(Q_{e_s})) := \underset{(e,s)=1}{\overset{p,q}{Eval}}\left(\bigcup_{\hat{e}}^{n}(\hat{A}_{\hat{e}}'(Q_{e_s})) : \left\{\begin{array}{l}[s \in \mathbb{Z}: l \leq s \leq m]\\ [e \in \mathbb{Z}: j \leq e \leq k]\end{array}\right\}\right) \quad [5.03]$$

$$\tilde{R}_e''(\hat{A}_{\hat{e}}'(Q_{e_s})) := \underset{\hat{e}=1}{\overset{n}{Eval}}\left(\underset{(e,s)=1}{\overset{p,q}{\bigcup}}(\hat{A}_{\hat{e}}'(Q_{e_s})) : \left\{[\hat{e} \in \mathbb{Z}: h \leq \hat{e} \leq i]\right\}\right) \quad [5.04]$$

The "subject to" notation directly to the right of the primary functional expression indicates that the array of elements is limited in each case to a particular domain of evaluation which is provided by the system like those demonstrated in FIG. 10A in the case of evaluation [5.03] and FIG. 10B in the case of evaluation [5.04].

In all cases the result of the evaluation either of two arrays of responses (i) $\{R_e''\}$ or (ii) $\{\tilde{R}_e''\}$ respectively which can be evaluated by various forms of regression analysis, curve fitting, and other statistical techniques utilized for functional discovery which result in the generation of a Utility Preference Model function which yields a best-fit for the dependent array identified as the Response Preference from the independent array identified as the Survey Response.

6: Derive Utility Functions

A Utility Preference Model generation function, UPM(•), is used to create a utility function, $U_e''(\bullet)$, which represents the generalized choices which an Evaluator would make if provided with a set Survey Responses. The UPM function generation is employed for each individual Party and Co-Evaluator using the Preference Responses according to the here identified methods: (i) conjoint analysis, (ii) stated preference analysis, (iii) discrete choice analysis, and (iv) other forced-choice methodologies.

The essence of these methods are that they statistically evaluate the Preference Responses of Evaluators relative to the Survey Responses provided by the Respondents in order to statistically approximate a function which best explains the relationship between the Preference Responses and the Survey Responses. The methods employed for this statistical approximation include: (i) regression analysis, (ii) curve fitting, (iii) artificial neural network analysis, (iv) polynomial interpolation, (v) and other statistical techniques utilized for functional discovery.

See the following for examples of conjoint analysis and forced-choice techniques:

Cattin, P. and Wittink, R. "Commercial Use of Conjoint Analysis: A Survey", 45 *Journal of Marketing* 44-53 (No. 3, Summer, 1982) and "Commercial Use of Conjoint Analysis: An Update", 53 *Journal of Marketing* 91-96 (July, 1982)

Green, P. E. and Wind, Y. "New Way to Measure Consumer's Judgments", *Harvard Business Review*, July 1975

Green, P., Krieger, A. and Wind, Y. (2001) "Thirty years of conjoint analysis: reflections and prospects", *Interfaces*, Vol. 31, No. 3.

LoPinto, Frank A. and Ragsdale, Cliff T. (2009). "Efficient modeling of individual consumer preferences: facilitating agent-based online markets", *International Journal of Electronic Marketing and Retailing* 66-81, (Volume 3, Number 1/2010).

Ramirez, Jose Manuel (2009). "Measuring: from Conjoint Analysis to Integrated Conjoint Experiments". *Journal of Quantitative Methods for Economics and Business Administration* 9: 28-43.

See also references identified in the bibliography of Patrick Bohl: *Conjoint Literature Database CLD*, University of Mainz, Germany, 1997.

The foregoing articles and references are hereby incorporated herein by reference.

A utility function is created which represents an individual Evaluator. The utility function provides a generalized best-fit predictive approximation of the dependent array of Response Preferences which an evaluator would assign as output values from the input values of the independent array of Survey Responses. Consequently, the utility function serves to approximate the relative value assignments which the Evaluator would have assigned a series of attribute levels if those values had been assigned by a Respondent.

In furtherance of the above, the Utility Preference Model generation function is employed to derive two possible utility functions: (i) a utility function which provides the Party's utility for each attribute level with respect to other attribute levels within a given attribute category, as well as each attribute with respect to other attributes, as well as each collection of attributes with respect to other collections of attributes; or alternatively (ii) a utility function which provides the Party's utility for each relevant Counterparty Entity.

The first possible utility function, identified in the above as (i) in the above paragraph is displayed on FIG. 3B, step [105]. The second possible utility function, identified as (ii) in the above paragraph is displayed on FIG. 3B, step [107]. These utilities are also mathematically represented herein as follows, which can be represented as the evaluation of a system of functions in the first case or as a system of arrays in the second case. Both are equivalent:

$$U''_e(\hat{A}'_{\hat{e}}(Q_{e_s})) := UPM(R''_e(\hat{A}'_{\hat{e}}(Q_{e_s})), \hat{A}'_{\hat{e}}(Q_{e_s})) \quad [6.01]$$

$$U''_e(\hat{A}'_{\hat{e}}(Q_{e_s})) := UPM(\{R''_e\}, \{\hat{A}'_{\hat{e}_{e_s}}\}) \quad [6.02]$$

The Utility Preference Model generation function UPM(•) here represents a statistical procedure used to discover the functional relationship between the Preference Response and the Survey Response as well as the vote aggregation procedure. The utility function derived from the evaluation of Evaluators' Preference Responses for Responders Survey Responses can be expressed in two ways: (i) as above where the utility function represents the utility that Evaluators have for individual attribute levels of attributes expressed as Survey Responses or (ii) as the utility which Evaluators have for collections of attribute levels of attributes, which collections can also serve as proxy for a set or subset of attributes which represents the Entities themselves.

The distinction between these two methods is nuanced; however, in the second case the whole is more than the sum of its parts—meaning that the total utility conveyed to a Evaluator would be greater than the sum of two or more discrete utilities values alone. In such a case the mathematical representation uses the superscript tilde (•̃) in order to distinguish the two methods. This utility function can also be represented as a system of arrays just as above.

$$\tilde{U}''_e(\hat{A}'_{\hat{e}}(Q_{e_s})) := UPM(\tilde{R}''_e(\hat{A}'_{\hat{e}}(Q_{e_s})), \hat{A}'_{\hat{e}}(Q_{e_s})) \quad [6.03]$$

$$\tilde{U}''_e(\hat{A}'_{\hat{e}}(Q_{e_s})) := UPM(\{\tilde{R}''_e\}, \{\hat{A}'_{\hat{e}_{e_s}}\}) \quad [6.04]$$

A Party's ranking or evaluation of these Survey Responses may be conducted in conjunction with Co-Evaluators which may either evaluate part or all of the survey responses provided by Counterparties and Co-Respondents. Functionality is preferably provided for Parties to incorporate the evaluations of other Evaluators within a single utility function through the use of a vote aggregation method (VAM). The principal Party identifies which rules within the vote aggregation method apply to integrating the votes within the Party and Co-Evaluator relationship to determine how the separate utility functions of these evaluators integrates to result in the formation of an aggregate utility function. Within the embodiment of this disclosure the rules which define this voting system are designated as (f).

In particular, the application of voting methods within the decision support system reduces the temporal distance between data entry and system evaluation because it can apply the encoded group preferences (using vote aggregation procedures) to evaluate each set of attributes that belong to each Counterparty attribute in a very few computer cycles. This contrasts with the prior art, which does not encode group preferences using vote aggregation procedures, nor does it then apply these encoded group preferences to evaluate Counterparty attributes. Because of this reduction in temporal distance between data entry and system evaluation, the number of computer cycles which occurs between these two events is reduced. This leads System 1000 to achieve a better utilization rate than the prior art. (The utilization rate here is defined as the ratio between number of slack-periods and the number computer cycles necessary to complete a process.)

The method for integrating the Preference Responses of Parties and Co-Evaluators is performed by applying a series of voting system evaluation rules to the utility functions generated by the Utility Preference Model generation function. All the possible permutations of the vote aggregation methods of the voting system are too varied to be individually described herein; however, all of the vote aggregation methods employ similar common elements which can be described in detail here. These common elements are as follows:

(1) Each vote aggregation method of the voting system identifies candidates which can be selected or alternatively excluded. In this case the description of candidates which can be selected or excluded encompasses various decision options which can be selected or excluded which also encompasses any selection from amongst a group of one or more Entities.

(2) Each vote aggregation method of the voting system employs a threshold of selection wherein a certain value or quota must be obtained in order for a selection to be considered valid or alternatively invalid in certain cases.

(3) The vote aggregation method of the voting system contains a method of weighting various votes wherein a vote can receive any weight from negative infinity to positive infinity.

(4) The vote aggregation method of the voting system contains a voting sequence which includes one or more tiers of voting.

(5) The vote aggregation method of the voting system contains various players or actors who are able to choose candidates or options.

(6) The vote aggregation method of the voting system contains various classifications wherein either players or alternatively candidates may select or be selected respectively according to the specific classification into which they fall where there are one or more classifications.

(7) The vote aggregation method of the voting system contains various conditions wherein candidate information and selections are made available. Any combination of the above can be employed by one or more a Parties and Co-Evaluators in the process of evaluating entities within the scope of this invention.

For the purpose of appropriately interpreting the application of various vote aggregation methods of the voting system, the following terms commonly used in describing the elements of vote aggregation methods and voting systems which have or will be used can be transposed or interchanged so that they might have application within this disclosure. "Candidate" or "options" can be substituted as a Counterparty, Entity, or Respondent depending on the context. "Player" or "actor" can be substituted as a Party or Evaluator depending on the context. "Quota" can be interpreted as a threshold rule.

Several voting system rules and designs are within the scope of this invention. The vote aggregation method of the voting systems include but are not limited to: blackball method, white-ball method, dictator voting method, multiple quota method, weighted voting method, plural voting method, selective weighted method, multiple class voting method, Condorcet method, Borda method, Copeland method, Nanson method, Dodgson method, Eigenvector method, cardinal utility method, successive selection method, single transferable vote method, simple majority, runoff method, limited vote method, cumulative vote method, and the Black method. A more full description of various voting methods which are applicable is included in the following references. These are included within the embodiment of this disclosure.

Cranor, Lorrie. "Vote Aggregation Methods". *Declared-Strategy Voting: An Instrument for Group Decision-Making*. Retrieved Mar. 26, 2012 from: http://lorrie.cranor.org/pubs/diss/node4.html.

Arrow, Kenneth J. (1951, $2^{nd}$ ed., 1963) *Social Choice and Individual Values*. New Haven: Yale University Press. ISBN 0-300-01364-7

Boix, Cares (1999). "Setting the Rules of the Game: The Choice of Electoral Systems in Advanced Democracies". American Political Science Review 93 (3): 609-624. Doi:10.2307/2585577. JSTOR 2585577.

Colomer, Josep M., ed. (2004). *Handbook of Electoral System Choice*. London and New York: Palgrave Macmillan. ISBN 9781403904546.

Each of the foregoing is hereby incorporated by reference.

Figure 11:
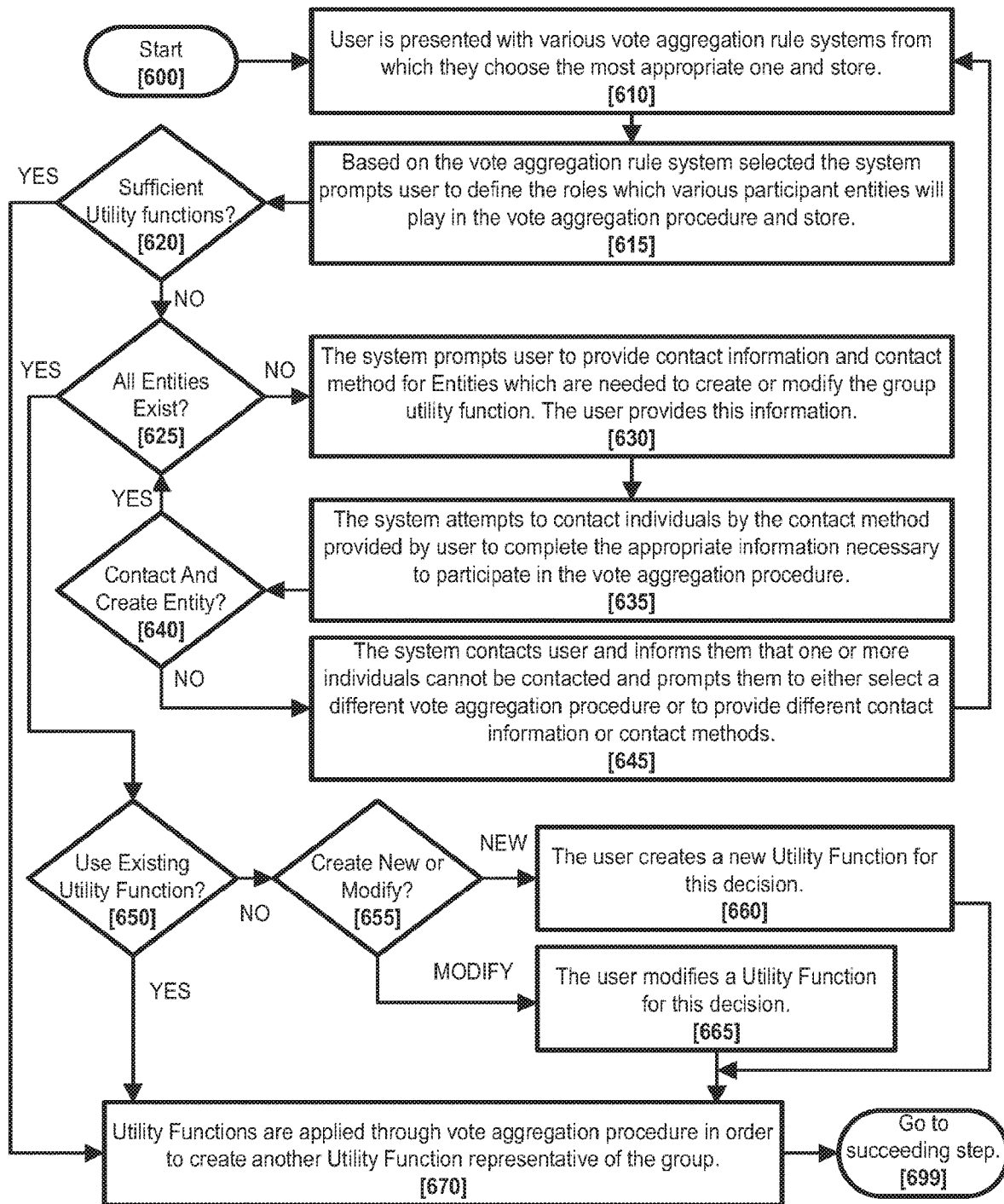
FIG. 11 is a flowchart illustrating the process whereby vote aggregation rules are selected and applied to create utility functions representative of more than one User.

FIG. 11 illustrates the steps associated with the process of creating group utility functions. At [step 610] the principal orchestrating User is provided with a list various vote aggregation rule systems which may be applied to their evaluation of a decision. From this list they select a vote aggregation rule system which they would like to apply to a particular decision. This identified vote aggregation system is stored to an electronically retrievable medium.

At [step 615] depending on the particular roles and rules which exist within the particular vote aggregation system, the system prompts users to define the various roles which they would like participating Entities to play within their vote aggregation process. This is stored to an electronically retrievable medium. At [step 620] the system determines whether sufficient utility functions exist for the vote aggregation to be immediately applied. If there are sufficient utility functions then the creation of a group utility function proceeds [step 670]. If there are not sufficient utility functions then the system diagnoses the reason for why the utility function cannot be created beginning with [step 625] determining whether all Entities identified indeed exist. At [step 630] if all Entities do not exist, for instance the principal User has identified an Entity they would like to participate in the vote aggregation procedure which the system does not recognize, then the system at [step 630] prompts the user to provide the contact information and a contact method in order to communicate with the Entity and create both the Entity profile and an individual utility function, as identified in steps [103] and [105] or [107] (FIG. 3). The User then provides this information. Next, at [step 635] the system attempts to contact the individuals according to the contact information and methods provided by the referring User. At [step 640] if the system is unable to contact the Entity then the system sends a message to the referring User prompting them to select either a different vote aggregation rule or to provide different contact information or a contact method in order to contact the individual they have identified to participate in the vote aggregation process [step 610].

If sufficient utility functions exist and Entities exist, then evaluation proceeds to [step 650] where the Entity being incorporated into the evaluation determines whether or not to use an existing utility function for the evaluation or not. At [step 655] if the Entity is determines not to use an existing utility function, then the Entity selects whether to create a new utility function or to modify an existing utility function. If the Entity selects to create a new utility function then they undergo the process of encoding their utilities by providing Preference Responses to the system for various Respondent Survey Responses. Otherwise if the Entity has determined to modify a utility function then they select one or more elements of the utility function which they would like to modify [step 665]. This can be performed through two possible means: (i) the User identifies particular Survey Response categories or equivalently, attribute levels, for which the utility function does not serve their particular needs. In this case, the system identifies the dependent relational attributes within the function which help to describe that particular user's preferences and provides the user with Survey Responses which address these particular attributes collectively in order to determine the relative preferences of these attributes with respect to the rest of the function. The Utility Preference Model generation function then creates a new utility function based on the new Preference Responses provided by the user. Or, (ii) an expert User may directly modify the functional coefficients of the utility function.

At [step 670] If the Entities determine to use either existing utility functions [step 650] or have sufficiently created [step 660] or modified [step 665] utility functions then evaluation proceeds to apply the utility functions through a series of vote aggregation procedures which creates a group representative utility function. Each of the possible utility functions is aggregated through a vote aggregation method as indicated below. The aggregation rules are defined by the term (P) which both defines both the rules of vote evaluation and which Evaluator utility functions participate in the aggregation procedure.

$$U''_e(\hat{A}'_{\hat{e}}(Q_{e_s})) := \underset{\substack{n \\ e=1}}{\overset{n}{Aggr}}(U''_e(\hat{A}'_{\hat{e}}(Q_{e_s})), \bar{r}''_e) : \{\bar{e} \in \bar{r}''_e \quad [6.05]$$

$$\tilde{U}''_e(\hat{A}'_{\hat{e}}(Q_{e_s})) := \underset{\substack{n \\ e=1}}{\overset{n}{Aggr}}(\tilde{U}''_e(\hat{A}'_{\hat{e}}(Q_{e_s})), \bar{r}''_e) : \{\bar{e} \in \bar{r}''_e \quad [6.06]$$

Utility Preference Model generation functions and utility functions are stored to an electronic retrievable media where they can be retrieved, reused and modified to facilitate other decisions determined by the Party. A method is provided for either (i) individual utility function or (ii) group utility function to be evaluated and modified by selected Users. The ability to store and retrieve Utility Preference Model generation functions and utility functions allows for several features which are included within the scope of this invention. It is also within the scope of this invention to evaluate the varying differences which may the preferences of Parties to the attributes of Counterparties and to be able to identify and evaluate these differences.

Accordingly the means are provided for the following:
(i) The asynchronous collection of utility preferences by various Evaluators.
(ii) The collection, storage, and re-use of Utility Preference Model generating functions and utility functions. A means is also provided that once a series of utility preferences have been sufficiently accumulated and integrated for the creation of a utility function for a particular decision that the utility function which facilitates such decisions can be reused without the need of additional preference accumulation and integration in order to facilitate a similar decision.
(iii) A means is provided also that a User can selectively modify one or more parameters that comprise the Utility Preference Model generating function and the output utility function in order to optimize one or more goal outcomes which the Party has specified. This provides that after a utility function has been created and stored, that it can be afterward modified in order to either, (a) test various modifications to the utility function to see if these modifications might lead to better alternative decision outcomes—in which cases Evaluators might be able to identify changes which can be made to either individual preferences or vote aggregation procedures in order to modify the utility function which might lead to these modifications, or (b) in order to modify the utility preference model generating function or the utility functions to update them without having to undergo the complex evaluation of all relative attributes.

An example of which is that a Party creates a utility function which they used and are highly pleased to re-use frequently; however, a small but significant change in the applicability of Counterparty attributes has occurred such that utility function that previously reflected the Party's preferences now no longer does so. In this case a Party could simply update the relative coefficient factors that relate to that attribute or attribute levels in order to continue to reuse the utility function.

(iv) A means is also provided where a User can selectively modify the vote aggregation method in order to optimize one or more goal outcomes which the Party has specified. Similar to modifying the utility function above there are several instances where a Party may identify a reason to change the vote aggregation procedure. These may be (a) to test various modifications which could be made to the vote aggregation procedure which might lead to better alternative decision outcomes, or (b) in order to either update the utility function for changes that may have occurred within an organization which may alter the way a decision is made. If such were to occur the utility function needs to be able to reflect these potential changes through the vote aggregation procedure.

(v) Additionally, a means is also provided for Users to identify and measure the degree of decision influence which various stakeholders have on a decision process and how the varying differences in those decision inputs relate to decision outputs.

(vi) A means is provided for Users to identify and measure the degree of difference which a given arrangement of attributes may have relative to another given single arrangement or set of arrangements for a given set of utility functions.

An example of (vi) in use is the case of an employment decision is that an potential employer may wish to understand how competitive they are relative to other potential employers for the interest of potential employees. In this case the potential employer could evaluate the score which the attribute arrangement they possess with the utility preferences of potential employees and compare that with the attribute arrangements of one or multiple other potential employers for the same group of potential employees. This would enable the potential employer to be able to identify attributes where they are non-competitive and where they might be able to invest greater resources in order to gain the attention of a better pool of potential employees.

Alternatively, this same feat could be accomplished by potential employees who could evaluate the attributes they possess against those of other potential employees in what can be effectively termed the "applicant pool" such that they can better understand the features that either make them competitive or which need improvement in order to invest their limited resources to become competitive with the rest of the market.

Alternatively this same feature could be applied in the case of a servicing decision where service vendors could compare themselves to other vendors relative to the interests of service consumers. Service consumers could compare themselves to other service consumers relative to the preferences of vendors. This could also be applied similarly in the case of a real estate decision where an owner or owner's agent could compare the attributes which their entity might offer relative to other entities relative the interests of buyers/leasers and buyers/leaser's agents or counter-wise. As well, this could be applied in the case of a financial investment decision where the relative attributes of a financial investment could be compared to the attributes of other financial investments relative to the interests of investors or counter-wise.

7: Mutually Evaluate Utility Functions

FIG. 2 [step 70] and FIG. 3B [step 108] calculate and total the utility functions for each Party acting in one role of a decision are applied to each Survey Response provided by each arrangement of Counterparties acting in another role in order to calculate a mutual utility value. This mutual utility value is able to identify the arrangements of Entities which can provide, ideally, with the highest possible utility for all Parties participating in a decision.

The calculation of a mutual utility score for each Party and Counterparty combination within a decision enables System 1000 to discover how closely aligned each mutual arrangement of Parties, Counterparties, and other decision participants attributes is to each of the preferences of the Counterparties, Parties, and other decision participants respectively. This enables the system to very quickly determine which Party and Counterparty arrangements are mutually optimal configurations in a small number of computer cycles.

This scoring module provides significant technical benefits over the prior art system. The prior art system fails to score preference-to-attribute configurations-meaning that a score provided by that prior art system is unable to deliver reliable results, given that it is unable to detect the presence or absence of attributes in relation to preferences. Because it is unable to detect the presence or absence of attributes in relation to preferences the prior art system must yield a higher ratio of false-positives and false-negatives to true-positives and true-negatives than the asymmetrical multilateral decision support system.

System 1000's result is accomplished only after the utility function for each Party has been generated and it has been applied to each Counterparty (steps [106] and [107]). Having the utility function enables the system to compare attributes or collections of attributes to preferences for as many entities as are part of the system. The system does this by consecutively evaluating all of the attributes or attribute collections which a target Entity has at the utilities of a given Party and then totaling the sum of these values. This computerized method is demonstrated mathematically in the following formula. The elements identified in the formula are as follows: the input of the formula is $(P(\overset{''}{e}, \overset{'}{e}))$ where ($\overset{''}{e}$) represents the Party and ($\overset{'}{e}$) represents the Counterparty and the utility functions are taken from the above formulas. Naturally the OR operator, (V), is used to indicate a choice of operations depending whether discrete attributes are to be evaluated or whether attribute collections are to be evaluated.

$$\overset{n\binom{n}{\bullet}\binom{m}{\bullet}}{P}(\overset{''}{e}, \overset{'}{e}) := \sum_{(e,s)=1}^{i,j} \left( U_{\overset{n}{\overset{''}{e}}}\left(\hat{A}_{\overset{m}{\overset{?}{e}}}(Q_{e_s})\right) \right) \vee \left( \tilde{U}_{\overset{n}{\overset{''}{e}}}\left(\hat{A}_{\overset{m}{\overset{?}{e}}}(Q_{e_s})\right) \right) \quad [7.01]$$

The superscriptions of ($\overset{n}{\bullet}$) and ($\overset{m}{\bullet}$) over the input elements and the primary functional element help to further identify the role assigned to each value in further indexing operations which become obvious later. For instance if there are three primary roles in any given decision arrangement then (m) and (n)=3. The first role then evaluates all Entities attribute levels at the second and third roles (as is represented in FIG. 4 where each Entity arranged in a system evaluates each other Entity for a given role in a given decision). It should be obvious to one skilled in the art that any number of roles equal or greater than two can be evaluated in the decision process.

In application of these evaluations, the system multiplies each sum by a set of weights assigned to each Party acting in each role. This is done to address the reality that in some cases the intensity of interest of a Party acting in one role does not equal that of a Party acting in another role. Each Party can consequently express the intensity of their Preference Responses relative to the Preference Responses of another Party by indicating either a lower or higher value for this weight. This is useful in a variety of circumstances such as a decision where Parties might possess strong preferences seeking to distinguish decision candidates to a given threshold but then once that threshold is met might be relatively acquiescent to the preferences of another Party. As aforementioned the following mathematical function follows. This function is a component of the Evaluation and Scoring Module in FIG. 1. [1070].

$$T(\overset{''}{e}, \overset{'}{e}) := \sum_{(n,m)=1}^{i,j} \overset{n\binom{n}{\overset{''}{e}}\binom{m}{\overset{?}{e}}}{P}(\overset{''}{e}, \overset{'}{e}) w_{\overset{n}{\overset{''}{e}}} : n \neq m \quad [7.02]$$

The weighted sum is then evaluated at every relevant arrangement of Parties and Counterparties acting in their preferred roles. This is represented by the following mathematical operation where Phi, (φ), represents the indexed function which performs this evaluation for all arrangement permutations in order to derive the sum from formula [7.02] for each arrangement. The result of this operation is the vector {V} which is a sortable list of mutual utility scores for a given arrangement of roles for a decision. This list is associated with an arrangement of Entity's preferences with each other Entity's attributes for a given arrangement. Each of these mathematical operations or its mathematical equivalents is within the scope of this invention. This list of arrangements and utility values is generated and returned to the Party (FIG. 3B [step 109]).

$$\overset{l,k}{\underset{(g,h)=1}{\phi}} T(g, h) \xrightarrow{yields} \{V\} \quad [7.03]$$

8: Return List & Optimize Arrangements

With reference to FIG. 2 [step 80] and FIG. 3B [step 109] Counterparties are provided with the means to assign the attribute level of one or more attributes a range of values which are assigned either (i) explicitly by a Respondent or (ii) by a value which is assigned by state of a function which explains one or more attribute levels of other attributes and of other attribute levels of another Entity.

By providing a means for ranges of values to be assigned Parties are provided with the means to maximize the utility value that can be identified from various combinations of entity attributes in ways which may not be immediately apparent between Party or Counterparty but which may nonetheless be available with a combination of attribute levels Counterparty.

The ability of System 1000 to discover and optimize configurations between a Party and Counterparty and other decision participants provides significant improvements over the prior art. This capability greatly reduces the work effort, and system resources, necessary to discover such optimal configurations. For instance, in the prior art the discovery of such optimal configurations requires an overwhelming amount of system resources to perform. This is so because prior art systems fail to mutually score the preferences of Parties with the attributes of Counterparties, meaning that if even if each Party's preferences were known and each Counterparty's attributes were also known an individual would still have to manually attempt by trial-and-error every permutation of Counterparty arrangement of each attribute to a Party preference until the optimum could be found. This permutation is equal to $$\frac{(AttributeLevels \times \text{Attributes})!}{((AttributeLevels \times \text{Attributes}) - (\text{Attributes}))!}.$$

Thus this number grows very quickly. Consider the case where there would be 50 attribute levels, 25 attributes, and 100 Parties (which is not unusual). The resulting number of permutations that would have to be tested by trial-and-error would be approximately $2.079 \times 10^{77}$. Consequently, since a prior art system would have to use at least that many computations to perform the survey administrations alone, and an equal number of records, such a optimization problem becomes infeasible under the prior art systems-even if this number were fractionalized by several factors.

For instance in the example of a service decision a service provider may be able to provide several variant levels of service at various price levels where the attribute levels for the service levels might be:

{2, 4, 10} within {maintenance visits per year} (represented below in the formula $X_1$), and {4, 4, 10} within {emergency visits per year} (represented below as $X_2$), and {6000, 8000, 10000} within the attribute {prices} (represented below as $X_3$) respectively.

In this case if the utility function for the Party making the decision were $(0+2*X_1+0.75*X_2-(X_3/750))$ then the relative utility yields would be {-2.5, 0.3333, 14.1667} with positive values representing better utility yields. Consequently, even though the first and second options might be competitive decision options for other Parties only option number three would be highly valuable to the Party with the above utility function. If the Counterparty would have provided only the information for option one or two then the Party might have overlooked them; however, when the information for option three is provided then it is apparent that one of the offerings of the Counterparty entity is highly valuable.

Because multiple options can be represented by Counterparties, the individual utility functions of Parties are able to be applied to the diverse offerings of Counterparties in ways that will yield maximal utility values for a Party that are unique-consequently providing that a diversity of variant options offered by Counterparties can be paired with the corresponding diverse preferences of Parties in such a way that maximizes the Parties overall utility amongst all options provided by Counterparties.

Furthermore, because System 1000 provides a means where the attribute level of an entity is the result of a function where the inputs of the function are the attribute levels of one or more attributes of another entity. It provides for complex decisions to be facilitated amongst Parties and Counterparties providing a means whereby an entity can coordinate with other trusted entities to provide unique arrangements of attribute levels and attributes to a decision that would not otherwise be available.

For example a service provider entity identified as, ($\hat{e}'=10$), has an attribute level where the attribute levels might be $\{0, \ldots, 400, 500, 600, 700, \ldots, \infty\}$ within the attribute {service capacity}. Because this service provider does not provide this service directly it therefore relies on trusted third-party entities to provide this service. Therefore the attribute level for this attribute is a function of the sum of the service capacity of the service contractors that provide that service to that entity. Consequently the attribute level of Entity ($\hat{e}'=10$) for the attribute of ($Q_{4_6}$) can be represented as follows:

$$\hat{A}_{10}(Q_{4_6}) = \hat{A}_4(Q_{4_6}) + \hat{A}_8(Q_{4_6}) + \hat{A}_{15}(Q_{4_6}) \qquad [8.01]$$

In another example, a purchase decision is made which relies on credit to be present in order for the transaction to occur. An attribute level is assigned by a Co-Respondent as one of two possible states {available, not available} within the attribute of {credit available} which makes the transaction either possible or not possible. The function which describes this attribute level of {credit available} is the result of whether the sum of two attribute levels of different attributes exceeds a given value which in this case is 499999. The attribute level of a Counterparty which is identified as {outstanding credit balance} and can have the levels of $\{0, \ldots, 500000, 510000, 520000, \ldots, \infty\}$ is added to the attribute level of another Co-Respondent identified as {appraised value+20% cushion} which can have attribute levels of $\{0, \ldots, 500000, 510000, 520000, \ldots, \infty\}$. Consequently if the sum of the attribute level for {appraised value+20% cushion}+{outstanding credit balance}<499999 then the attribute level of {credit available} will be {not available}. Alternatively if the sum of {appraised value+20% cushion}+{outstanding credit balance}>=499999 then the attribute level of {credit available} will be {available}.

A means is provided for an entity acting as a Counterparty in a second role to discover the most preferred attribute levels which must be provided to a Party in first role in order to optimize a result of one or more Counterparty attribute levels in a first role and the mutual utility values that exists between a first and second role. A means is also provided whereby an Entity can identify the degree of difference between the most preferred attribute levels which must be provided to optimize a result and the attribute levels which have been provided. These attribute levels may be returned either as values or as graphical interpretations of values.

Figure 12A:
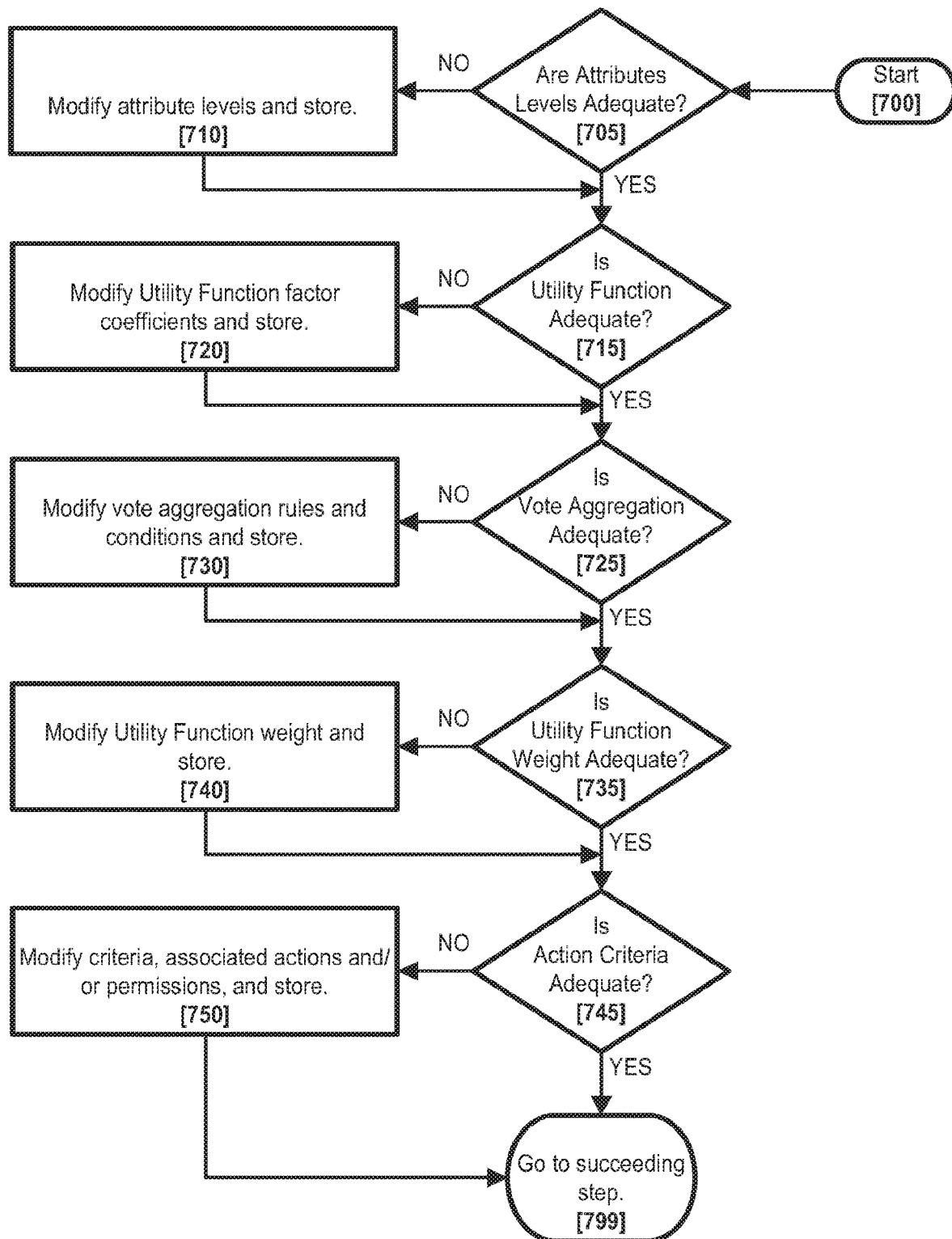
FIG. 12A is a flowchart illustrating the process whereby Entities modify and update various elements associated with their Entity.

Accordingly FIG. 12A provides a means for Entities to optimize the attribute levels which are provided to System 1000 in order to yield a most preferred result such that [step 705] determines whether the attribute levels of an Entity are adequate for the Entity's objective if it is not evaluation is performed at [step 710] which provides a means to modify the attribute levels of the Entity and stored, otherwise evaluation proceeds to [step 715]. Evaluation then proceeds to [step 715].

In an example of optimizing attribute levels for a contracting decision, a service provider seeks to optimize the attribute levels of a Counterparty for the selected attributes (available work) and {work growth rate} subject to specific constraints of {(work requirement 1)} and {(work requirement 3)} in order to secure contracts that will potentially provide it with the greatest possible future benefits. Consequently the service provider needs to know which attribute levels it would need to provide such that it could secure these most preferred contracts with contracting Counterparties. System 1000 returns a series of listed conditions like the following which an entity would need to supply in order to optimize the indicated Counterparty attributes:

TABLE 12

{on-time delivery history } >= 95%,
{current annual business volume } >= 125000,
{technical expertise 1} >= 7,
OR
{professional service rating } >= 9
{current annual business volume } >= 100000

Alternatively System 1000 could provide the differences between current attribute levels which an entity possesses relative to the attribute levels which are most preferred in order to optimize a Counterparty attribute level as follows:

TABLE 13

{on-time delivery history} + 10% if the current attribute level were 85%,
{current annual business volume} + 20000 if the current attribute level were 105000,
{technical expertise 1} + 1 if the current attribute level were 6,
OR
{professional service rating} + 2 if the current attribute level were 7,
{current annual business volume} + 5000 if the current attribute level were 95000.

The above helps the user identify the attribute levels that would need to be met by the entity associated with the user in order to optimize the attribute levels of Counterparties which the user has identified. Once these attribute levels are identified then the service provider can go about making the investment and organizational changes necessary in order to achieve these attribute levels to secure the most preferred contracts.

A means is provided for an Entity acting as a first Party to discover the most preferred utility function factor coefficients which must be utilized in evaluating first Counterparty attribute levels in order to optimize a result of one or more first Counterparty attribute levels and mutual utility values. A means is also provided whereby an entity can identify the degree of difference between the most preferred utility preference model factor coefficients and the utility preference model factor coefficients which have been utilized by that entity.

Accordingly, [step 715] an User determines whether the utility function of an Entity is adequate, if it is not [step 720] provides a means for an Entity to modify one or more utility function factor coefficients which are subsequently stored, otherwise evaluation proceeds to [step 725]. Evaluation then proceeds to [step 725].

In the example of an industrial equipment decision an industrial equipment user seeks to identify which utility function factors would optimize the attribute levels of the attributes of {price per} and {price term} subject to specific constraints placed on each of the following attributes: {daily operators needed}, {daily operational maintenance}, and {(equipment specification 1)}. System 1000 then performs an evaluation which identifies the combination of utility function factors states which would combine to optimize the particular attribute levels of the attributes selected by the industrial equipment user. The output of this process would be a list of factor coefficients identified by their descriptions and the states that would need to exist in order to meet the optimization conditions specified by the user. For example of the above may indicate that the factor coefficients would need to be as follows:

The below are included in the table form of (description, factor, coefficient value to optimize outcome):

TABLE 14

| DESCRIPTION | FACTOR | COEFFICIENT VALUE TO OPTIMIZE OUTCOME |
|---|---|---|
| {working hours on machine} | X3 | $b3 <= -(1/7500)$ |
| {peak daily output} | X5 | $b5 >= (1/1095)$ |
| {daily operational time in hours} | X7 | $b7 >= (1/22.5)$ |
| OR | | |
| {included maintenance} | X18 | $b18 <= (0.26)$ |
| {installation options} | X20 | $b20 <= (0.19)$ |

This means that if the utility function which described interests of the Party and that function that the user could optimize the results of the mutual evaluation by modifying the factor coefficients of the utility function to either of the above two scenarios. Alternatively System 1000 could identify these values by the degree of difference which they were from the utility function coefficients possessed by the entity associated with the user. This might be represented as follows:

TABLE 15

| DESCRIPTION | FACTOR | COEFFICIENT VALUE TO OPTIMIZE OUTCOME |
|---|---|---|
| {working hours on machine} | X3 | $b3 + (1/8990 - 1/7500)$ where the factor coefficient possessed by the entity is (1/8990) |
| {peak daily output} | X5 | $b5 + (1/2000 - 1/1075)$ where the factor coefficient possessed by the entity is (1/2000) |
| {daily operational time in hours} | X7 | $b7 + (1/30 - 1/22.5)$ where the factor coefficient possessed by the entity is (1/30) |
| OR | | |
| {included maintenance} | X18 | $b18 + (0.34 - 0.26)$ where the factor coefficient possessed by the entity is (0.34) |
| {installation options} | X20 | $b20 + (0.25 - 0.19)$ where the factor coefficient possessed by the entity is (0.25). |

In either case System 1000 identifies the combinations of factor coefficients that can be applied in order to optimize the results of mutual evaluation to the specification of party. Accordingly the Party could use these values to compare its internal preferences, systems, and organizational mechanisms to identify the varying internal costs and economic impacts of such preferences play within its selection mechanisms and identify if changes to such preferences may be in its long-term best interests.

At [step 725] of FIG. 12A Entities are provided with a means to determine and optimize vote aggregation rules by a User determining whether the vote aggregation rules are adequate for that Entity's needs, if it is not evaluation proceeds to [step 730] which provides a means for an Entity to modify one or more vote aggregation rules which are subsequently stored, otherwise evaluation proceeds to [step 735]. Evaluation then proceeds to [step 735].

Additionally a means is provided for an entity to discover the most preferred first Party to second Party preference weight in order to optimize a result of one or more Counterparty attribute levels and mutual utility values, whereby the utility preferences of first Party for first Counterparties' attribute levels are weighted against the utility preferences of the second Party for second Counterparties' attribute levels and the weights between them is the value to be discovered. Accordingly this can be represented as $P(e, \bar{e})w + \overline{P(e, e)}\overline{w}$ where the most preferred ratio of weight of the first Party, (w), is determined against the weight of the second Party, ($\overline{w}$) in order to optimize the result.

Consequently, in [step 735] a User determines whether the utility function weight which they have assigned for an Entity's preferences is adequate, if it is not [step 740] provides a means for an Entity to modify the utility function weight which is subsequently stored, otherwise evaluation proceeds to [step 745]. Evaluation then proceeds to [step 745].

In the example of a financial investment decision an investor acting as a first Party seeks to maximize the relative return on investment by maximizing the Counterparty attribute level for {historical return statistical mean parameter p}. In order to do this her preferences must be weighed against the preferences of a second Party investment manager, who has his/her own criteria for investors. Because the investor's relative preferences are important but the weight of her preferences versus those of a second Party are not she seeks to find the ideal preference weight which might yield her the best possible return. Accordingly System 1000 then performs an evaluation which identifies the possible preference weights which will optimize the particular attribute levels of the attribute she has selected. The output of this process is a weight which needs to be applied in order to meet the optimization conditions specified by the user. For example of the above may indicate that the weight would need to be as follows:

$$w <= 0.38$$

Alternatively System 1000 could identify these values by the degree of difference which they were from the weight which would need to be possessed by the entity associated with the user in order to meet an optimal state. This might be represented as follows:

$$w - 0.12$$

FIG. 12A, also illustrates that the adequacy of action criteria is determined which is performed by Users at [step 745]. If the action criteria are found to be inadequate evaluation proceeds to [step 750] which provides the means for an Entity to modify one or more action criteria which are subsequently stored, otherwise evaluation proceeds to [step 799]. Evaluation then proceeds to [step 799].

A means is provided to evaluate, identify and provide to users the number and proximal magnitude of similar utility which competing Parties represent relative to the number and proximal magnitude of attribute levels of attributes possessed by Counterparties. Similarly a means is also provided to evaluate, identify and provide to users the number and proximal magnitude of similar attribute levels of attributes which competing Counterparties represent relative to the number and proximal magnitude of utilities possessed by Parties. Together these two evaluations provide users with the ability identify and evaluate the relative ratio of mutual demand versus mutual supply within a proximally associated cross-pairing of utility preferences and attributes such that a user can identify both the individual and mutual proximally relative Party demand for certain attribute levels of attributes as well as identify the individual and mutual proximally relative Counterparty supply of attribute levels of attributes. Together these evaluations provide Parties and Counterparties with the ability to evaluate their positions relative the proximal supply and demand of other decision participants.

More particularly a means is provided to evaluate and supply to users the number and proximal magnitude of difference of (i) an Entity associated with a Party against other entities associated with other Parties relative to a set or subset of Counterparty entities, (ii) an entity associated with a Counterparty against other entities associated with other Counterparties relative to a set or subset of Parties, and (iii) entities associated with Parties against other entities associated with other Parties relative to entities associated to Counterparties against entities associated with other Counterparties. The means of identifying and evaluating the relative competitiveness of these entities is performed by evaluating the (i) Euclidean distance or (ii) Shepard similarity of Parties or Counterparties. Proximity in the first case of Euclidean distance consists of the evaluation of vector distance between two vectors. Proximity in the second case of Shepard similarity represents the inverse of the Euclidean distance through a negative power function of the distance of two vectors. In either case they are both mathematically similar functions relying fundamentally on the Euclidian distance of vectors. The proximity of attribute levels to attributes is evaluated with respect to a set or subset of Parties' utility functions in the case of evaluating Counterparty entities. The proximity of utility functions is evaluated with respect to a set or subset of Counterparties' attribute levels of attributes. The Euclidean distance evaluation between two entities can be mathematically represented as follows:

$$d\left(\overset{''}{e}, \overset{'}{\hat{e}}, \overset{\overline{''}}{e}, \overset{\overline{'}}{\hat{e}}\right) := \sum_{(e,s)=1}^{m,n} \left| U''_e\left(\hat{A}_{\hat{e}}(Q_{e_s})\right) - U_{\overline{e}}\left(A_{\overline{\hat{e}}}(Q_{e_s})\right) \right| : \begin{cases} [s \in \mathbb{Z} : l \le s \le m] \\ [e \in \mathbb{Z} : j \le e \le k] \end{cases} \quad [8.02]$$

In order to systematically represent the possibly confusing arrangement of terms where one entity acts as a Party and Counterparty and another entity acts as a Counterparty and Party respectively these two counterpart operations are distinguished from one another in this disclosure by the convention of the over-script bar. In the case of the evaluation of the proximity of Counterparties the evaluation of $(d(\overset{''}{e}, \overset{'}{\hat{e}}, \overset{\overline{''}}{e}, \overset{\overline{'}}{\hat{e}}))$ is such that the terms, ($\overset{''}{e}$) and ($\overset{\overline{''}}{e}$) are identical: ($\overset{''}{e} \equiv \overset{\overline{''}}{e}$). In the case of the evaluation of the proximity of Parties the same evaluation is such that the terms, ($\overset{'}{\hat{e}}$) and ($\overset{\overline{'}}{\hat{e}}$) are identical: ($\overset{'}{\hat{e}} \equiv \overset{\overline{'}}{\hat{e}}$).

This evaluation is subject to the limits which a user places on the (e) and (s) variables. It should be obvious to anyone skilled in the art that any number of combinations of proximity evaluations between and among Parties and Counterparties can be drawn from the above. It should also be obvious to one skilled in the art that the respective weights of the vectors being compared can be provided in order to enhance the evaluation of proximal relativity between and among weights even though it is not included in the above representation. This proximity evaluation is also used to classify and categorize various Party utility functions relative to one another and Counterparties, and Counterparty attribute levels at various attributes relative to one another and various Party utility functions. It results in a list of underlying values when the evaluation is performed for each pairing which compares each Party to each Party relative to Counterparties or each Counterparty to each Counterparty relative to each Party which results in a list that can also be represented as a vector in each case.

$$\overset{j,k,l}{\underset{(g,h,i)=1}{\overset{\sim}{\Psi}}} d\left(e_i'', e_g', \overline{e}_i, \hat{e}_h^T\right) \overset{yields}{\longrightarrow} \{\overset{\sim}{D}\} \text{ OR } \overset{j,k,l}{\underset{(g,h,i)=1}{\overset{\sim}{\Psi}}} d\left(e_i'', \hat{e}_i', \overline{e}_h, \hat{e}_i^T\right) \overset{yields}{\longrightarrow} \{\overset{\sim}{D}\} \quad [8.03]$$

The Shepard similarity measurement can simply evaluated as the inverse power of the distance evaluation. In the case below the natural number (E) is used representing the Euler constant with the same rules that apply to the evaluation of Parties and Counterparties as given above where (d) represents the Euclidean distance.

$$E^{-d\left(e'',e',\overline{e},\hat{e}^T\right)} \quad [8.04]$$

Likewise to the above Shepard similarity measurement is applied which results in a list of underlying values when the evaluation is performed for each pairing which compares each Party to each Party relative to Counterparties or each Counterparty to each Counterparty relative to each Party which results in a list that can also be represented as a vector in each case. For simplicity of expression only two arrangements of pairings has been provided in this disclosure, however, it should be obvious to anyone skilled in the art that proximal distances can be calculated between more than just two Entities in relation to a third utility function. These distance relations can be calculated by between any two or more Entities in relation to one or more Utility functions.

$$\overset{j,k,l}{\underset{(g,h,i)=1}{\overset{\sim}{\Psi}}} E^d\left(e_i'', e_g', \overline{e}_i, \hat{e}_h^T\right) \overset{yields}{\longrightarrow} \quad [8.05]$$

$$\{\overset{\sim}{D}\} \text{ OR } \overset{j,k,l}{\underset{(g,h,i)=1}{\overset{\sim}{\Psi}}} E^d\left(e_g'', \hat{e}_i', \overline{e}_h, \hat{e}_i^T\right) \overset{yields}{\longrightarrow} \{\overset{\sim}{D}\}$$

The result of either of these evaluations is a vector of proximities of various Parties utility functions, represented by ($e''$) and ($\overline{e}$), against the proximities of Counterparties, represented by ($\hat{e}'$) and ($\hat{e}^T$). Subsequently the result of Equations [8.03] and [8.04] can be also represented as a tensor of a rank greater than 1, or alternatively as a list of lists, or alternatively as an array {•} as herein represented. This structure has the advantage of being able to non-obviously perform mathematical evaluations such as Ricci calculus, spectral analysis, linear optimization, and linear algebraic transformations, which individually or together, enable decision participants to most quickly identify varying combinations of proximal relationships of the supply of a given combination of attributes and/or utilities for those attributes to the demand for those same attributes and/or utilities in relation to a set or subset of decision participants.

Figure 12B:
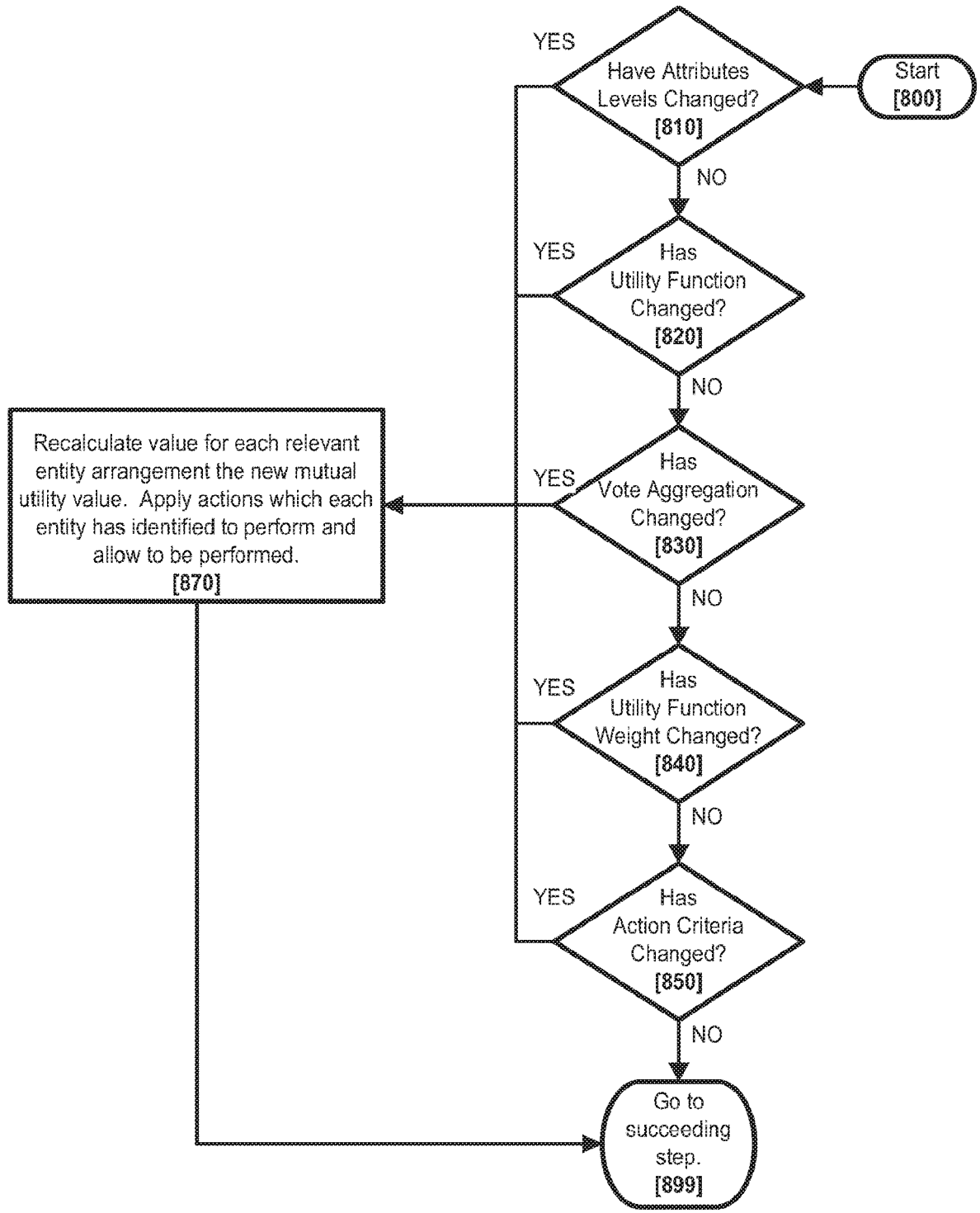
FIG. 12B is a flowchart illustrating the process through which when a given change occurs within the system, the evaluation of the results are recalculated and re-evaluated.

FIG. 12B shows how System 1000 recalculates the mutual utility values of Entity arrangements if system variables are updated. In [step 810] the system determines whether attribute levels have changed, if they have evaluation proceeds to [step 870], otherwise evaluation proceeds to [step 820] at which a determination is made as to whether a utility function has changed; if it has evaluation proceeds to [step 870], otherwise evaluation proceeds to [step 830] where the system determines whether a vote aggregation rule has changed; if it has evaluation proceeds to [step 870], otherwise evaluation proceeds to [step 840] where the system determines whether a utility function weight has changed; if it has evaluation proceeds to [step 870], otherwise evaluation proceeds to [step 850] which determines whether any action criteria has changed; if it has evaluation proceeds to [step 870], otherwise evaluation proceeds to [step 899].

[Step 870] recalculates the mutual utility value of each arrangement consisting of a full complement of roles for a given decision. Accordingly as each of the mutual utility values are recalculated all of the individual actions which are to be performed if certain rule criteria are to be met are likewise determined and performed and allowed to be performed if the corresponding rule criteria are met.

9: Perform Actions

With reference to FIG. 2 [step 90] and FIG. 3B, under certain conditions Parties may desire to perform actions to other Users or Entities or allow other Users or Entities perform actions to them based on a series of conditions which other Parties, Counterparties, Evaluators, or Respondents must meet in order to either perform actions or have actions performed to them.

The ability to automate certain tasks in relation to a decision support system provides a significant enhancement above the prior art. In particular, this feature reduces the temporal distance between system data reporting events and data input events necessary to process system messaging and reporting.

In particular, the prior art does not provide a technical means to trigger event-based actions based on meeting a series of sufficiency conditions which are defined by a user comparing that condition to a singular or mutual evaluation threshold. This means that the prior art provides a report to a system User where the system may wait idle for several thousand or million computer cycles until the report is received by the system User. After the message event is received, the system User then manually inputs data which represents an action they desire the system to perform. In contrast to the prior art, system 1000 allows pre-defined actions to be input into the system where these actions wait in queue for critical threshold events. When one or more of these critical threshold events is sufficiently met, the system automatically engages in the actions which were specified by the system User. This eliminates the temporal delay between messaging events provided by a system and the data inputs which are required by a system in order to perform the actions the system User specifies. This eliminates the many idle computer cycles that exist within this temporal space which is a condition of the prior art.

Several examples are now provided of the practical utility of this automation. In the example of an employment decision a potential employer may want to limit their accessibility of certain information from potential employees unless those candidates are reasonably appropriate for the position, as such the action which an employer would want to perform is to have certain information made conditionally visible to potential employees conditional upon those potential employees meeting a threshold of acceptability-such information may be contact information to a key resource within the potential employer's organization or other information which might help only very well qualified potential employees be placed at the potential employer's organization.

Likewise potential employees might want to perform the action of limiting the ability of their current employers or people working with their current employer from being able to view their interest in exiting an organization or in being contacted by potential employers which might not meet their specific criteria—thus the potential employee might establish a condition that a potential employer must not be one of the identified parties which could reasonably cause them harm.

In an example of a real estate decision an owner's representative might want to send the specific details of a property only to specific individuals who meet the financial qualifications in order to lease or acquire the property, as such the action which they might perform might be to send a message to those Counterparty Entities which meet those conditions. Contrarily, in the example of using conditions which would have actions performed to them, a financially well-qualified individual seeking real estate property might want to not receive messages which are sent to it unless the real estate meets very specific criteria which the individual has established-consequently, (using the same previous example) the criteria would not allow messages from real estate Entities unless the Entities met a specific criteria.

In the example of an industrial equipment decision certain details of manufacturing systems and processes might need to remain confidential except to prospective clients which have both signed a confidentiality agreement and which meet the legal criteria of being able to be held liable for damages should that confidentiality agreement be breached therefore an action might be established whereby this information is not revealed unless the criteria of the execution of an agreement are met. Also in the example of an industrial equipment decision prospective clients might need to reveal confidential information to clients which may legally require that those providers legally conform to a number of conditions before confidential information can be revealed. In the example of a contract decision a contractor might want to ensure that a subcontractor has adequate facilities and insurance coverage before a request for proposal is revealed. Likewise a subcontractor making a contract decision might want to ensure that a bond is posted in the case of a delinquency of payment occurs prior to revealing their confidential bid information.

System 1000 is designed to allow Entities to control the actions which they perform and the actions which are performed to them. The manner by which these actions are performed is provided is as follows.

Figure 13:
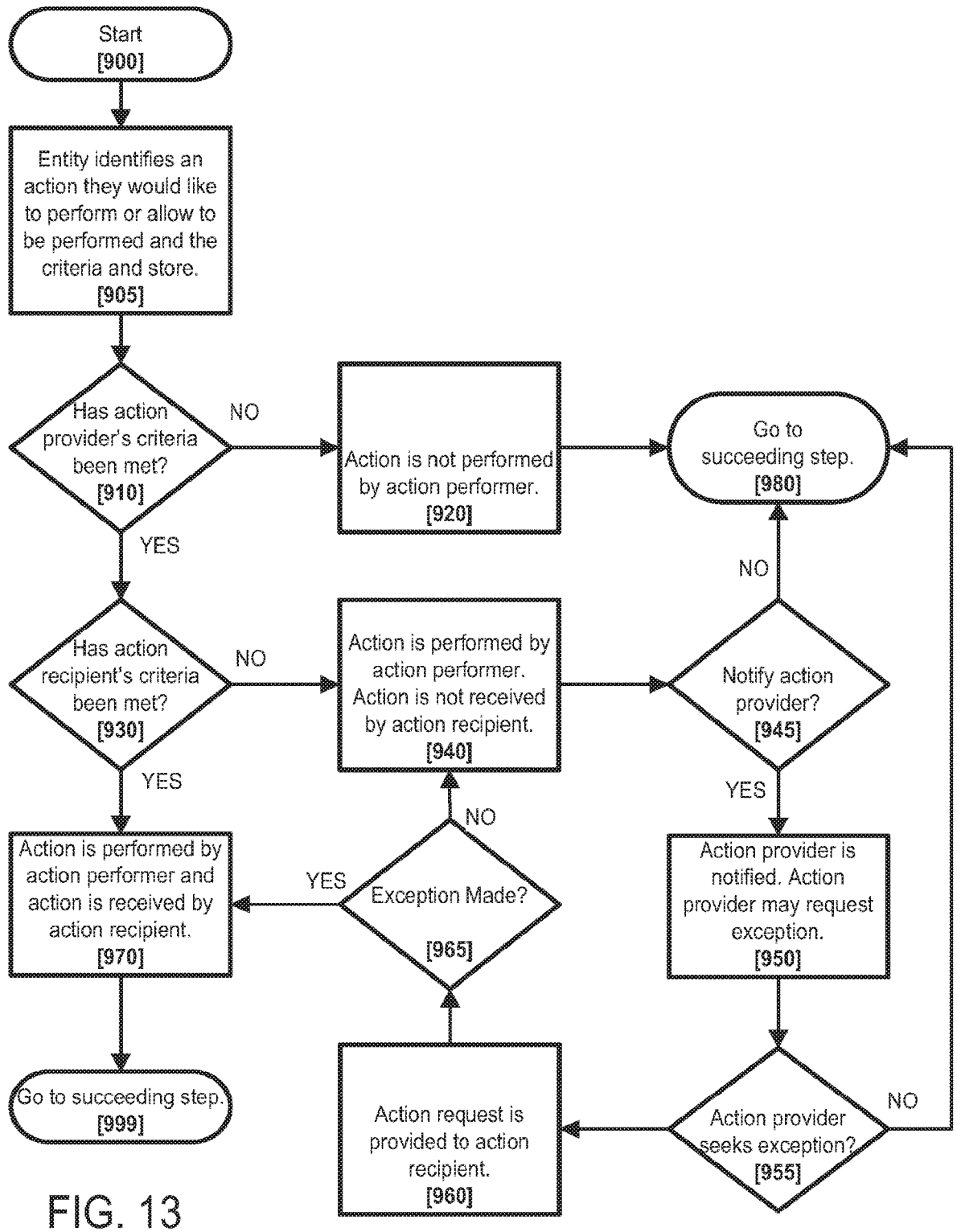
FIG. 13 is a flowchart illustrating the process whereby the system of the present invention evaluates criteria for subject Entities to perform Actions to object Entities and for subject Entities to allow object Entities to perform actions to the subject Entity.

With reference to FIG. 13, at [step 905] a subject Entity identifies an action they would like to perform or which the subject Entity would allow object Entities to perform to them along with the criteria which must be met in order to perform this action or have this action performed to them. At [step 910] a test is conducted in order to identify whether the action performer's criteria has been met. This test is also identified in FIG. 12B [step 870]. The test applies one or more conditions to the User or Entity's stored information identified in the condition and evaluates whether the User or Entity's information meets all of the conditions specified for the action to be performed by the subject Entity or for object Entities to perform an action to a subject Entity. If the test is failed the action is not performed [step 920]. If the test succeeds then another test is performed to determine whether the action recipient's criteria has been met [step 930]. If the action recipient's criteria is not met then the action performer's action is performed but not received by the action recipient [step 940]. A test is performed to determine whether the action recipient allows the action provider to be notified that their action has not been received [step 945]. If the action provider is not notified then go to [step 980]. If however, the action provider is notified then a message is sent to the action provider at [step 950] allowing the action performer to request that System 1000 make an exception to the action recipient's rules. A test is performed to determine whether the action provider seeks an exception to the rules [step 955]. Then at [step 960] a message is sent to the action recipient seeking an exception. The action recipient chooses whether to allow the exception and on what conditions the exception is made [step 965]. If the exception is made then the action is performed and it is received by the action recipient the same as if it had met the action recipient's criteria at [step 930].

With reference to FIG. 12B, a means is provided such that User can establish certain monitoring conditions whereby the status of one or more Attribute Levels for selected Attributes can be continuously monitored in one of two ways, (i) continuously, or (ii) periodically. The monitoring conditions may either apply to entities are either, (i) explicitly selected, or (ii) selected by meeting a certain threshold condition which applies to one or more attribute levels identified by the User. If a change is detected in status of a monitored Attribute then System 1000 communicates with a User over a communications network that the Attribute Level has been altered.

In the example of an employment decision, a potential employer may determine that they wish to monitor a number of potential employees and the status of an attribute level within the attribute {employment status} in the hopes that one of these potential employees' employment status may change from an attribute level of (unavailable) to {available}. Consequently as soon as the status change is made by the potential employee, or a co-worker which might be reporting the change on behalf of the potential employee, then the potential employer would receive the message from System 1000 and they would subsequently reach out to the potential employee undergoing the status change.

In an example of a contracting decision between a potential service vendor and a contractor the contractor may wish to monitor the status of the attribute {insurance approval} which attribute level is provided by the Co-Respondent of the service vendor's insurance company. If the status of attribute level for {insurance approval} were to change from {approved} to {unapproved} then the potential service vendor may no longer meet the criteria of the contractor. Counter-wise in the same contracting decision if a potential service vendor wanted to monitor the attribute (collections) which is provided by a credit agency Co-Respondent. The service vendor may be potentially granting the contractor with a line of credit. They would therefore want to identify if there are any changes which may affect the decision such that either an increase or a decrease in the attribute level might affect the decision that is made.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A decision support system for facilitating the recursive selection, evaluation, improvement, and completion of a limited set of useful surveys for a given decision over multiple iterations, comprising:
   a central processor;
   a computer-readable storage medium storing instructions which, when executed by the central processor, cause said central processor to perform operations comprising:
   controlling, by said central processor, a survey management module; and
   managing, by said survey management module, a provision of a plurality of surveys, said surveys having utility scores, said survey management module further comprising a genetic optimization module;
   implementing, by said genetic optimization module, an iterative feedback process over multiple iterations, said implementing further comprising:
      limiting, by said survey management module, an availability of at least one survey in a set of said surveys to be reviewed and/or selected by evaluators and/or respondents by comparing said utility score of said at least one survey against a threshold,
      providing, by said survey management module, to said evaluators and/or respondents said set of surveys related to a given decision,
      applying, by said survey management module, a limit to a total number of surveys available to be selected,
      requiring, by said survey management module, said evaluators and/or said respondents to select surveys from said set of surveys used in said decision,
      generating, by said survey management module, a relevance score for each survey in said set of surveys, each relevance score indicating relative utility of each survey,
      improving, by said genetic optimization module, said utility scores of said selected surveys, and
      depreciating, by said genetic optimization module, said utility scores of said excluded surveys.

2. The decision support system of claim 1, wherein the survey management module further obtains from said evaluator at least one new survey and/or at least one modification to an existing survey.

3. The decision support system of claim 1, wherein any individual utility score of said utility scores is at least one of the following:
   being derived from a utility function of preferences at least one said evaluator and/or said respondent has expressed for at least one attribute and/or at least one survey, or
   being an explicitly provided score value.

4. The decision support system of claim 1, wherein any individual utility score of said utility scores is further characterized by representing at the use of least one weight in its generation.

5. The decision support system of claim 4, wherein the at least one weight used is selected from the group consisting of:
   the importance of one entity relative to other entities,
   the number of transacted over a period of time,
   the size of a transaction over a period of time, and/or
   the volume of economic transactions over time.

6. The decision support system of claim 1, wherein the survey management module applies a cost function to limit the total number of surveys available to be selected by said evaluators and/or respondents within an iteration of the multiple iterations.

7. The decision support system of claim 1, wherein the decision is of a type selected from the group consisting of:
   a purchasing decision,
   a leasing decision,
   an employment decision,
   a servicing decision,
   a contracting decision,
   a real estate decision,
   an industrial equipment decision,
   a financial investment decision, and/or
   a supply chain decision.

8. A decision support method for facilitating the recursive selection, evaluation, improvement, and completion of a limited set of useful surveys for a given decision, comprising:
   employing, by a central processor controlling a survey management module, an iterative feedback process over multiple iterations further comprising:
      limiting, by said central processor controlling said survey management module, an availability of at least one survey in a set of surveys to be reviewed and/or selected by evaluators and/or respondents, said surveys having utility scores, by comparing said utility score of said at least one survey against a threshold,
      providing said set of surveys to said evaluators and/or respondents related to a given decision,
      for said given decision said evaluator and/or respondent, selecting a limited number of surveys from said set of surveys related to said decision,
      improving, by said central processor controlling said survey management module, said utility scores of said selected surveys, and
      depreciating, by said central processor controlling said survey management module, said utility scores of said set of surveys not selected.

9. The decision support method of claim 8, further comprising obtaining from said evaluator at least one new survey and/or at least one modification to an existing survey.

10. The decision support method of claim 8, wherein any individual utility score of said utility scores for any survey of said surveys is at least one of the following:
    being derived from a utility function of preferences at least one said evaluator and/or said respondent has expressed for at least one attribute and/or at least one survey, or
    being an explicitly provided score value.

11. The decision support method of claim 8, wherein any individual utility score of said utility scores for any survey of said surveys further represents at the use of least one weight in its generation.

12. The decision support method of claim 8, wherein the method further applies a cost function to limit the number of surveys selected by said evaluator and/or respondent within an iteration of the multiple iterations.

13. The decision support method of claim 8, wherein the decision is of a type selected from the group consisting of:
   a purchasing decision,
   a leasing decision,
   an employment decision,
   a servicing decision,
   a contracting decision,
   a real estate decision,
   an industrial equipment decision,
   a financial investment decision, and/or
   a supply chain decision.

14. The decision support system of claim 1, wherein said improving said utility scores further comprises:
   prompting, by said genetic optimization module, a user to determine that said selected surveys should be modified,
   prompting, by said genetic optimization module, said user to provide a rating of each survey in said selected surveys that identifies each survey's relative importance.

15. The decision support method of claim 8, wherein said depreciating further comprises:
   calculating, by said central processor controlling said survey management module, a Survey Utility Score (SUS) that indicates (i) a relative value of at least one survey in said set of surveys, and (ii) a degree which said at least one survey is used by said evaluator and/or respondent,
   obtaining, by said central processor controlling said survey management module, information on a number of users that have completed said at least one survey, to identify utility of said at least one survey,
   wherein said SUS comprises a weighted average of opinions which said evaluator and/or respondent have for said at least one survey.

* * * * *